United States Patent
Hoare et al.

(10) Patent No.: US 10,582,573 B2
(45) Date of Patent: Mar. 3, 2020

(54) MULTI COOKER

(71) Applicant: BREVILLE PTY LIMITED, Alexandria, New South Wales (AU)

(72) Inventors: Richard Hoare, Lane Cove (AU); David Davenport, Lane Cove (AU); Vyvyan Rose, Bronte (AU); Brendan John Foxlee, Earlwood (AU); Tibor Hegedis, Rosebery (AU); Marian Silviu Rosian, Forestville (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 0 days.

(21) Appl. No.: 15/320,743

(22) PCT Filed: Jun. 23, 2015

(86) PCT No.: PCT/AU2015/000364
§ 371 (c)(1),
(2) Date: Dec. 20, 2016

(87) PCT Pub. No.: WO2015/196240
PCT Pub. Date: Dec. 30, 2015

(65) Prior Publication Data
US 2017/0142780 A1 May 18, 2017

(30) Foreign Application Priority Data
Jun. 23, 2014 (AU) .............................. 2014902393

(51) Int. Cl.
*F24C 15/10* (2006.01)
*H05B 6/06* (2006.01)
*H05B 6/12* (2006.01)

(52) U.S. Cl.
CPC ........... *H05B 6/062* (2013.01); *F24C 15/105* (2013.01); *H05B 6/1263* (2013.01); *H05B 2213/07* (2013.01)

(58) Field of Classification Search
CPC ........ H05B 6/06; H05B 6/062; H05B 6/1209; H05B 2213/07; H05B 6/1263; F24C 15/105
(Continued)

(56) References Cited

U.S. PATENT DOCUMENTS 3,622,754 A * 11/1971 Hurko .................... F24C 15/102
126/400
3,786,220 A * 1/1974 Harnden, Jr. .......... F24C 15/105
219/445.1
(Continued)

FOREIGN PATENT DOCUMENTS

CN 203369799 U 1/2014
DE 2442369 A1 6/1975
(Continued)

OTHER PUBLICATIONS

International Search Report and Written Opinion for PCT/AU2015/000364, dated Nov. 10, 2015.
(Continued)

*Primary Examiner* — Alexander M Valvis
(74) *Attorney, Agent, or Firm* — Marshall, Gerstein & Borun LLP

(57) ABSTRACT

An induction cooker has a temperature sensor mount that includes a reciprocating sensor holder and a flexible diaphragm.

17 Claims, 25 Drawing Sheets

(58) Field of Classification Search
USPC .................................... 219/622, 626, 627
See application file for complete search history.

(56) References Cited

U.S. PATENT DOCUMENTS

| | | | | |
|---|---|---|---|---|
| 3,826,898 | A * | 7/1974 | Hurko | F24C 15/102 |
| | | | | 219/430 |
| 4,330,701 | A * | 5/1982 | Fischer | F24C 15/105 |
| | | | | 219/448.15 |
| 4,410,793 | A * | 10/1983 | Fischer | F24C 15/102 |
| | | | | 219/448.15 |
| 4,812,624 | A * | 3/1989 | Kern | F24C 15/105 |
| | | | | 219/448.14 |
| 9,175,861 | B2 * | 11/2015 | Sosso | F24C 15/2042 |
| 2013/0112683 | A1 * | 5/2013 | Hegedis | A47J 27/62 |
| | | | | 219/660 |

FOREIGN PATENT DOCUMENTS

| | | |
|---|---|---|
| EP | 0208670 A1 | 1/1987 |
| JP | H09213469 A | 8/1997 |
| JP | H10214680 A | 8/1998 |
| WO | WO-2008/075673 A1 | 6/2008 |
| WO | WO-2013/134239 A1 | 9/2013 |

OTHER PUBLICATIONS

International Preliminary Report on Patentability for PCT/AU2015/000364, dated Dec. 27, 2016.
Extended European Search Report for European Patent Application No. 15811740., dated Jan. 29, 2018.
Office Action and Search Report issued in Russian Patent Application No. 2017101731, dated Dec. 28, 2018.

* cited by examiner

Fig 1: Induction Cooker Schematic

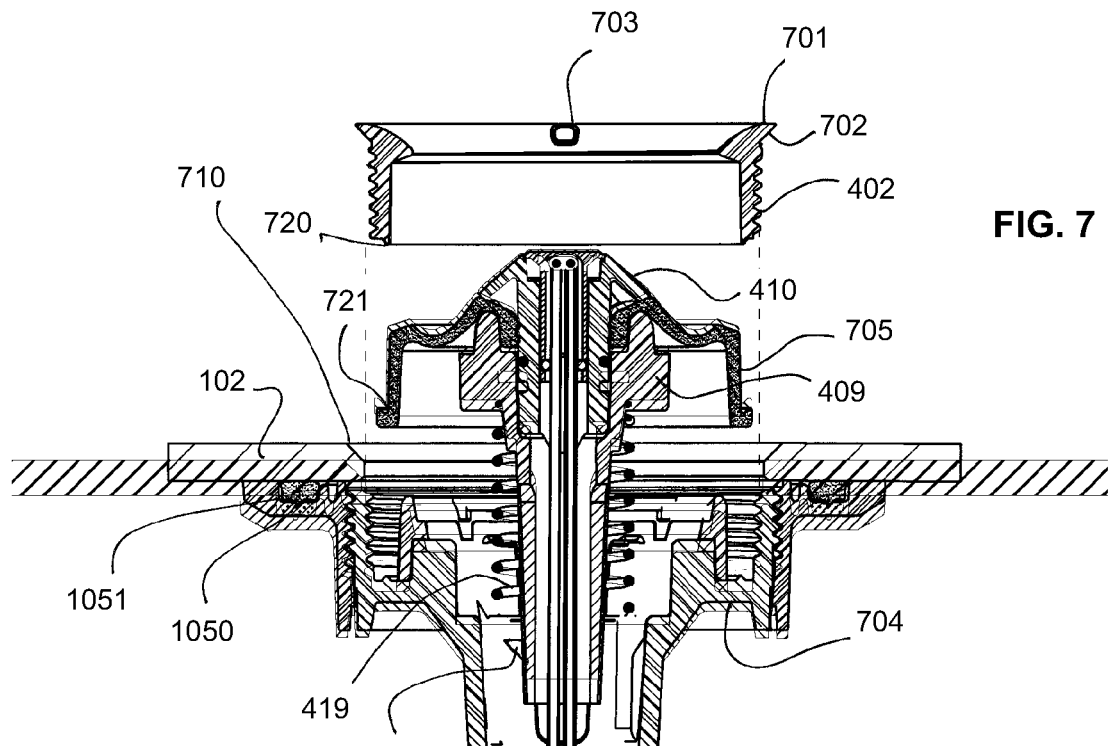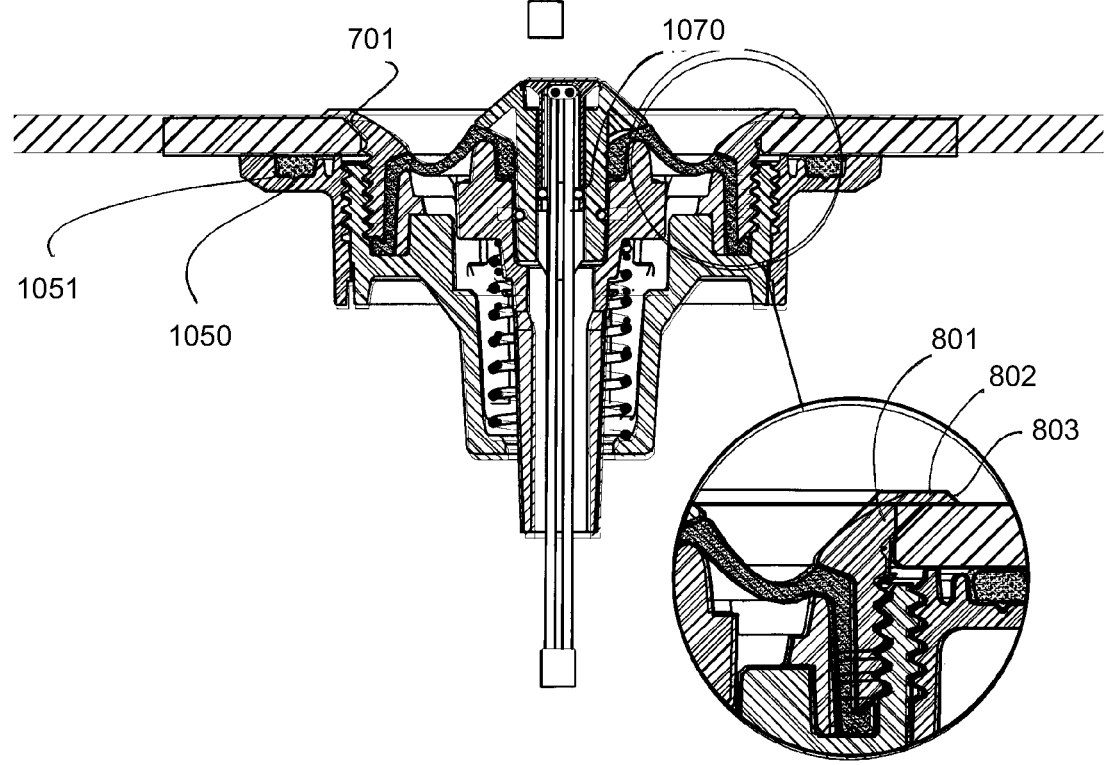

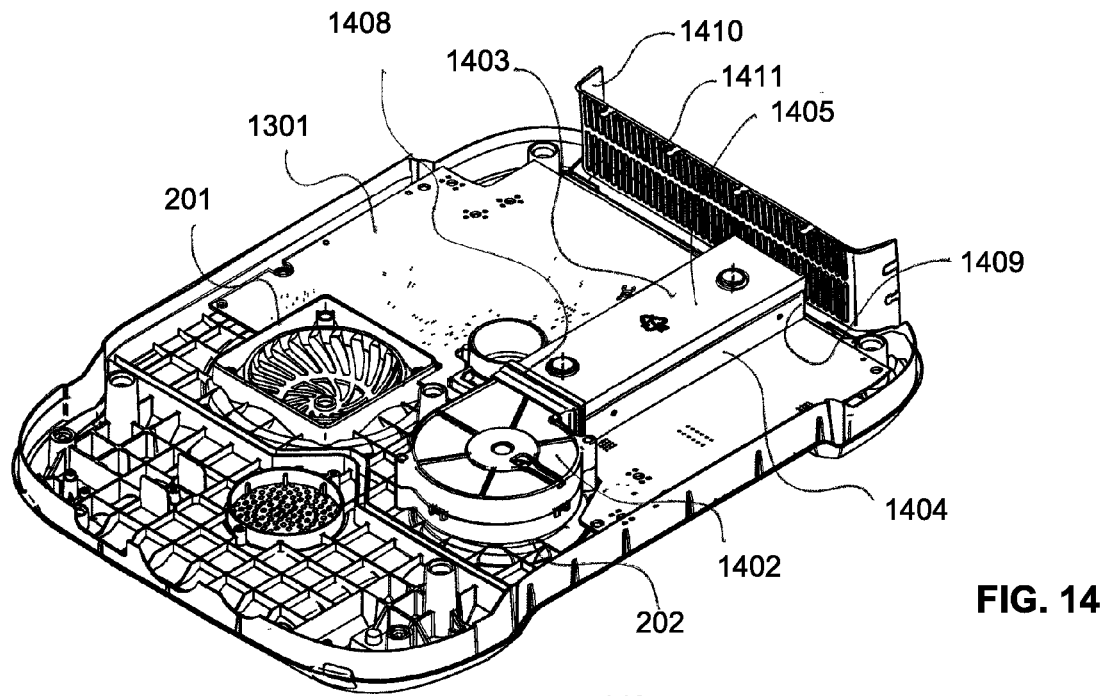
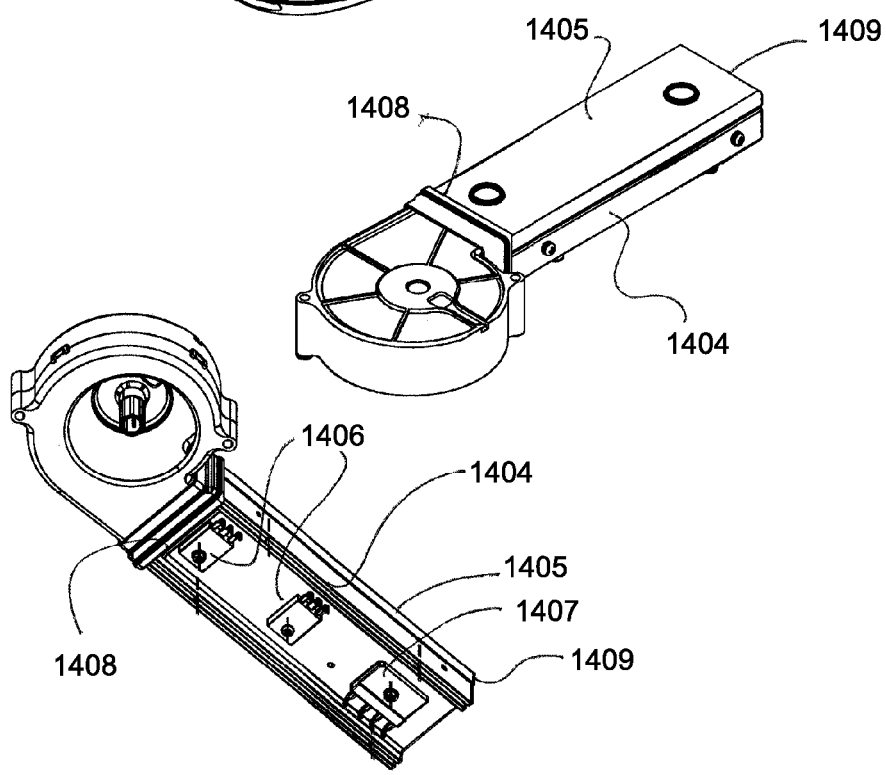
FIG. 14

MULTI COOKER

FIELD OF THE INVENTION

The invention relates to induction cookers and more particularly to a counter top appliance having induction heating capabilities.

BACKGROUND OF THE INVENTION

Induction cooking heats a cooking vessel for the purpose of heating food within the vessel. Cooking vessels for induction cooktops are usually ferromagnetic metal such as cast iron or particular stainless steels. A coil of copper wire is placed beneath a glass surface that supports the cooking vessel and an alternating electric current flows through the coil. This produces a magnetic field which induces an electric current in the cooking vessel. Current flowing in the vessel produces resistive heating. Heat from the vessel heats the food within the vessel. Radiant heat from the vessel also heats the glass on which the vessel rests and thereby, the components within the induction cooker.

Induction cookers in the prior art have limited capabilities with reference to temperature accuracy, versatility, user programmability, reliability, longevity and maintenance.

The present invention seeks to address, both alone and in combination some of the deficiencies associated with prior art induction cookers.

Induction cooking is known in both kitchen hobs and stand alone counter top appliances. Such hobs and appliances may have one or more induction coils so as to heat one or more vessels simultaneously. Accordingly, the present invention relates to induction hobs, stand alone induction cookers and other appliances incorporating one or more induction coils for cooking.

The contents of the applicant's PCT application PCT/AU2011/000887 (WO/2012/006674) is incorporated herein by reference.

OBJECTS AND SUMMARY OF THE INVENTION

It is an object of the invention to provide an induction cooker with improved cooking temperature accuracy and functionality.

It is another object of the invention to provide an induction cooker with enhanced reliability and serviceability.

It is a further object of the invention to provide an induction cooker having a replaceable cooking surface.

It is another object of the invention to provide an induction cooker that is programmable.

BRIEF DESCRIPTION OF THE DRAWING FIGURES

In order that the invention be better understood, reference is now made to the following drawing figures in which:

FIG. 7 is a cross sectional detail of a temperature sensor and sensor holder.

FIG. 8 is a cross sectional detail of a temperature sensor and sensor holder.

FIG. 14 is a perspective view of a fan arrangement for an induction cooker.

BEST MODE AND OTHER EMBODIMENTS

Figure 1:
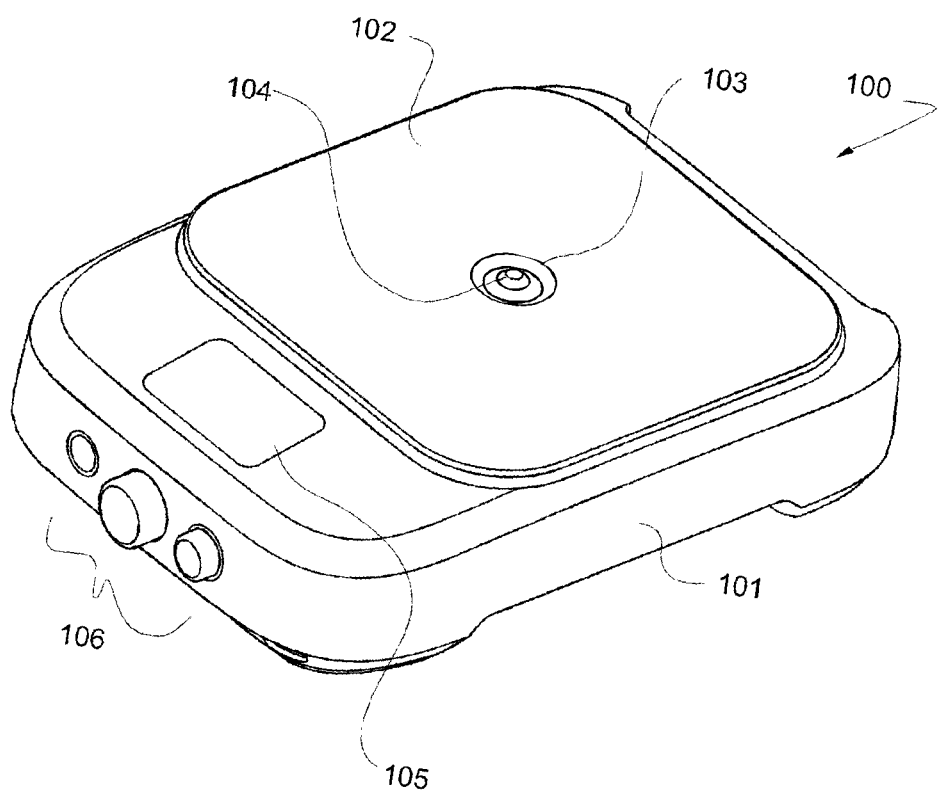
FIG. 1 is a perspective view of an induction cooker.
Figure 2:
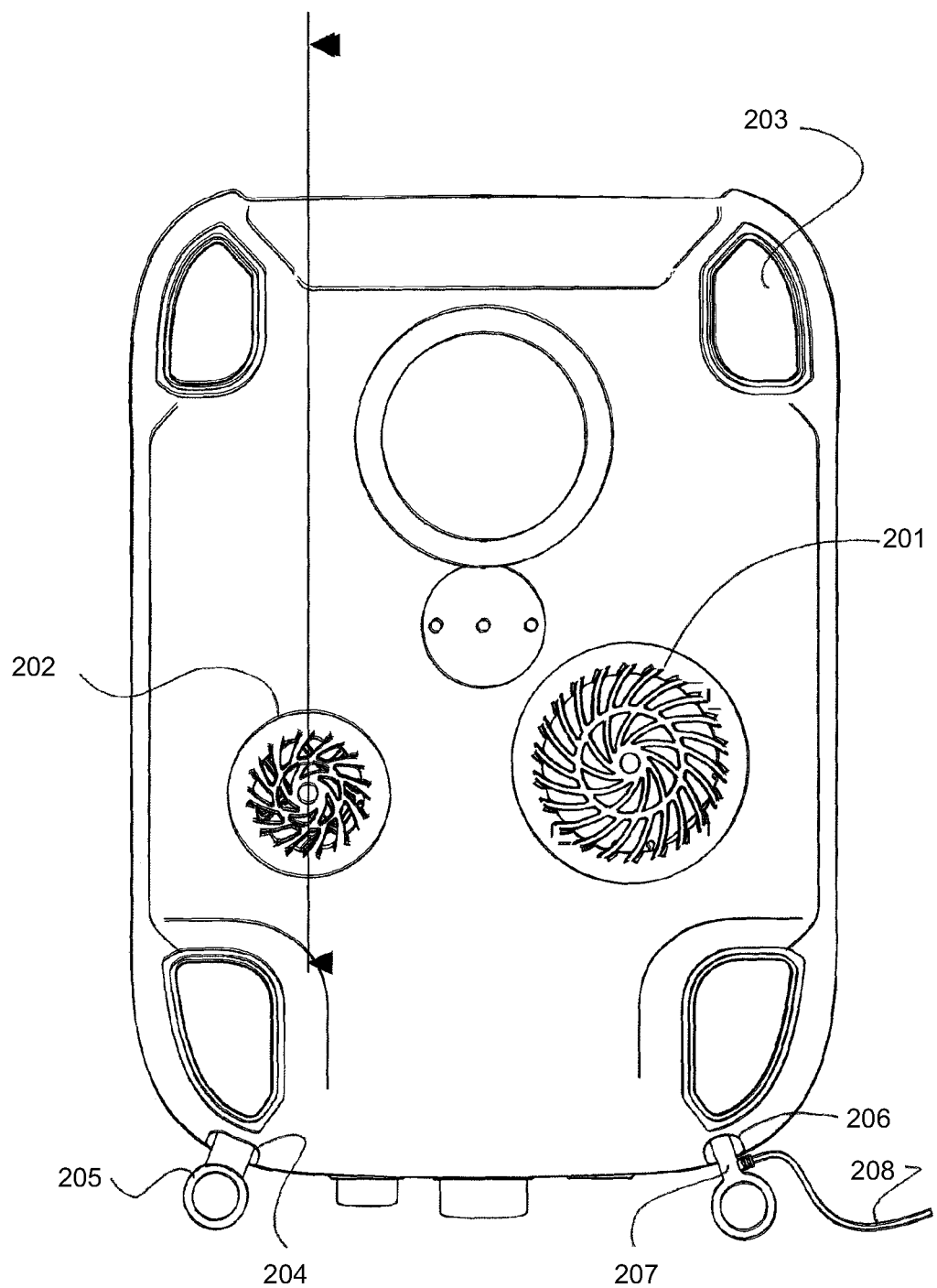
FIG. 2 is a plan view of the underside of the cooker depicted in FIG. 1.

As shown in FIGS. 1 and 2 an induction cooker 100 comprises an exterior body, case or shell 101, above which is mounted a heat resistant and heat stable ceramic glass cooking surface 102. The cooking surface 102 features a central opening 103 into which is mounted a temperature sensing assembly 104 that registers the temperature of a cooking vessel, particularly the underside of the cooking vessel and transmits data regarding same to the device's microprocessor control unit (MCU). In this example, the stand alone counter top appliance 100 has a graphic display 105 and various user inputs 106 for controlling the operation of the device. The user interface comprising display 105 and inputs 106 communicates with the device's MCU.

As shown more particularly in FIG. 2, the underside of the device features and inlet for a first cooling fan 201 that is associated with an induction coil cooling system and a second inlet 202 for a second fan that is associated with a power control cooling system. The intake 201, 202 are elevated above a resting surface by feet 203 that elevate the device 100 from the resting surface. The cooker 100 also features a USB port 204 for receiving and bi-directional communication with a removable USB device 205. A second port 206 is adapted to receive the plug end 207 of a removable, optional temperature probe 208.

Figure 3:
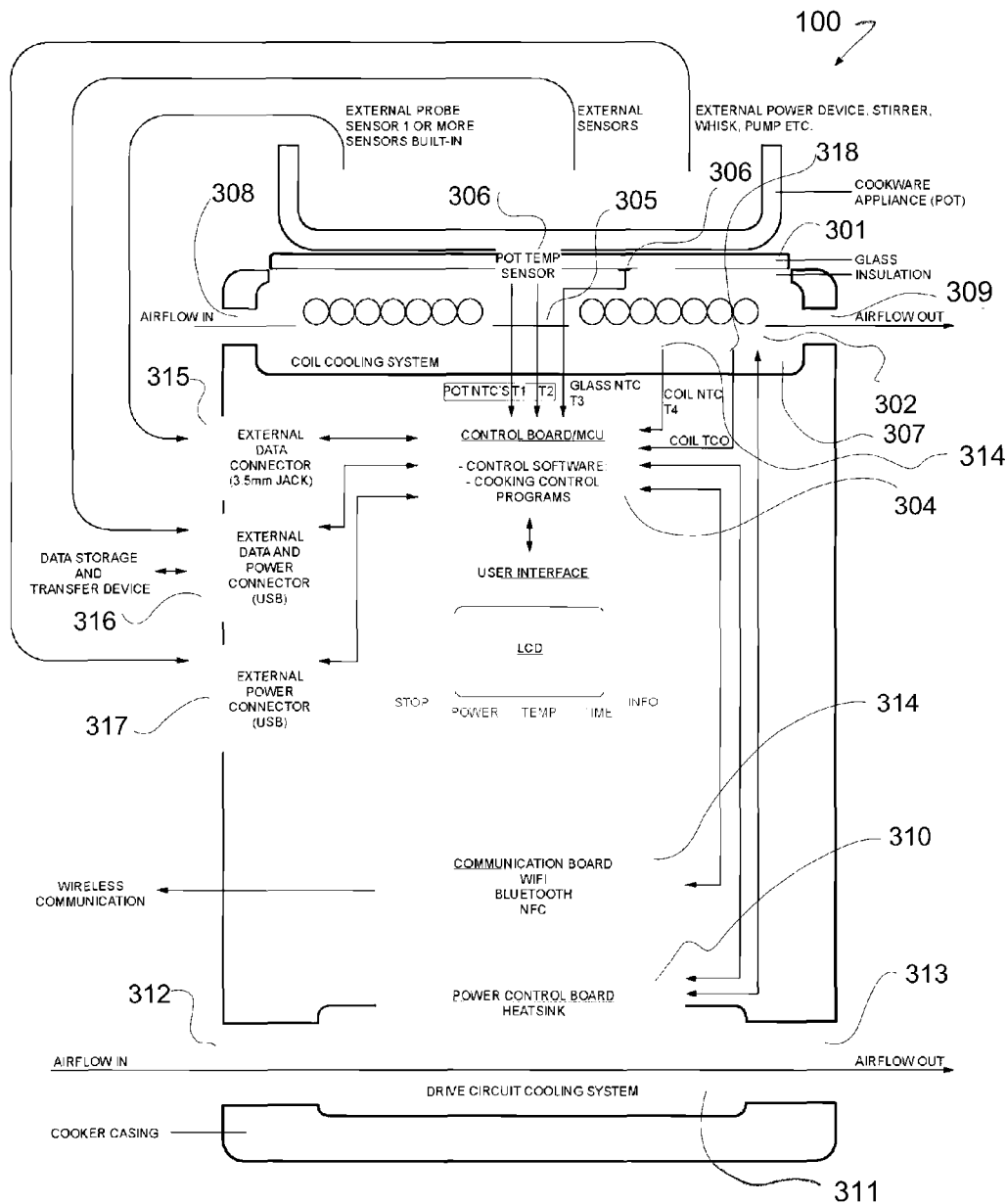
FIG. 3 is a schematic diagram of an induction cooker.

As shown in the schematic diagram of FIG. 3, an induction cooking device 100 comprises a ceramic glass cooking surface 301 below which is located an induction coil 302. The device's vessel temperature sensor 303, 104, resides in an opening formed in the glass 301 and communicates with the device's MCU 304. Electronic communication between the sensor 303 and the MCU 304 occurs through the central opening 305 of the induction coil 302. The temperature of the cooking surface 301 is monitored by a cooking surface sensor 306 located below the cooking surface 301. It also communicates with the MCU 304 through the central opening 305 on the induction coil 302. A first cooling system incorporates a fan and a flow path 307 whereby air enters the device through a first inlet 308 and is propelled by a fan through the flow path, preferably in which both sides of the coil are located before being exhausted from the device through a first outlet 309. The heat sinks of the power control board 310 are separately cooled by a second flow path 311. The second flow path 311 has a second inlet 312, its own cooling fan and a second outlet 313.

The MCU 304 communicates with the power control board 310, a communications board and sub-system 314. The communications sub-system includes circuitry for two-way communication utilising, for example, WIFI, Bluetooth, NFC or other wireless communication protocols, as appropriate. The MCU 304 also controls the induction coils 302 and receives data from a temperature sensor 314 located in thermal contact with and below the coils 302. As will be explained, the MCU receives signals from the vessel temperature sensor assembly 303 in the form of two distinct signals from two distinct sensors. The MCU also receives data from external devices such as temperature or other sensing devices, through a 3.5 mm jack port 315. The MCU also sends and receives data through a USB port 316 and utilises this data for controlling the device and saving data. The device may have a second or further USB port 317 for providing external power to an auxiliary device. As will be explained, the coils 302 may be associated with a second temperature sensor 318 that also provides temperature data to the MCU 304.

Figure 4:
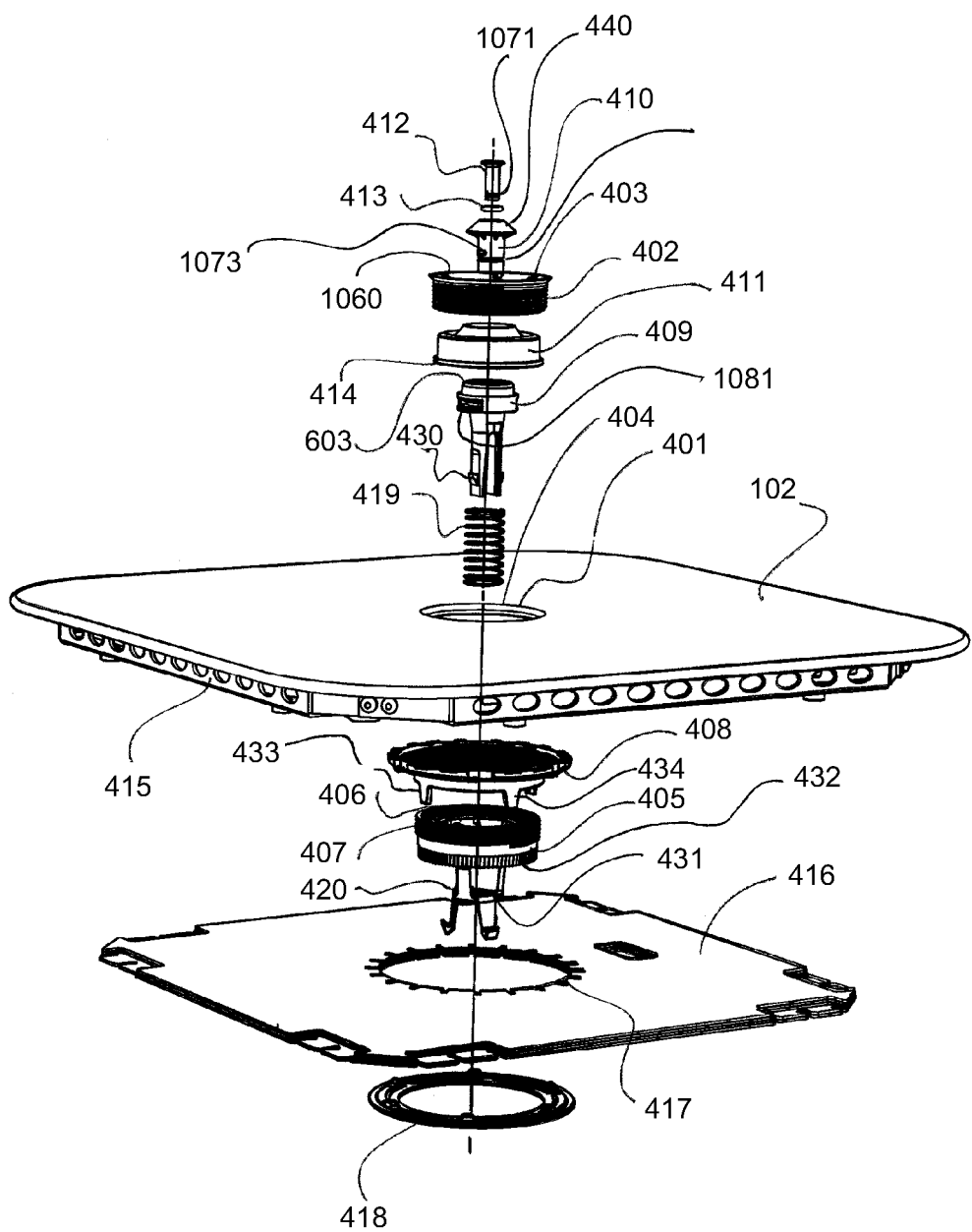
FIG. 4 is an exploded perspective view of a cooking surface, temperature sensor and insulation layer.

The construction and operation of a reciprocating temperature sensor mount assembly is illustrated in FIGS. 4-10B, shown in FIG. 4. A ceramic glass cooking surface 102 has a central chamfered opening 401. The opening 401 receives an exterior threaded and non-conductive clamping ring 402. The clamping ring has an upper, chamfered flange 403 that is received by and cooperates with the chamfer 404 formed around the central opening 401. The ring's interior rim chamfer 403a prevents the ring from passing through the opening 401, but sits completely below the upper surface of the cooking surface 102. A lower generally cylindrical sensor bracket 405 has internal and external threads 406, 407. The internal threads engage the external threads of the clamping ring 402 and draw the ring into a clamping engagement with the ceramic glass cooking surface 102. The external threads 407 cooperate with internal threads in an upper sensor bracket 408. The upper sensor bracket 408 is attached to the underside of the cooking surface, for example, with a room temperature vulconisation silicone (1050, FIG. 10). A sensor lower holder 409 receives an upper sensor holder 410. The upper sensor holder 410 is preferably a non-conductive material such as polymer and includes a chamfered surround 440 that forms a circumferential ramp of, for example, 45 degrees. The upper holder 410 rests within the lower holder 409 and is guided by it for vertical movement. When joined, the lower and upper sensor holders 409, 410 form a gap that receives the rim of an elastomeric diaphragm 411. The diaphragm 411 may be of the rolling diaphragm type so as to accommodate the vertical movement of the sensor and sensor holders without stretching excessively. The upper sensor holder 410 is adapted to receive a hollow and in this example, cylindrical sensor carrier or cap 412 that is thermally conductive and that protects the sensors. A seal 413 is interposed between the upper and lower sensor holders 409, 410. In this way the lower sensor holder supports the sensors for reciprocating movement. The outer rim 414 of the diaphragm is retained by the lower sensor bracket 405.

An underside of the cooking surface 102 is adhesively bonded to a mounting frame 415, as will be explained. A rigid insulation layer 416 is located below the cooking surface 102 and above the electronic components of the device so as to protect them from heat radiating from above. The insulation 416 has a central opening 417 by which the insulation layer is mechanically supported or alternatively clamped. A clamping ring 418 sits below the insulation 416 for this purpose.

A mechanical bias in the form of, for example, a compression spring 419 urges the lower sensor holder 409 upwardly, being supported from below by a lower portion of the lower sensor bracket 405 that is adapted to contain the spring 419. The lower holder 409 has one or more outward facing teeth 430 that are retained by a ring or other structure 431 located on the lower sensor bracket.

The aforementioned temperature sensor mounting assembly as depicted in FIGS. 4-10B is considered unique in its manner of assembly and disassembly. In particular, the sensor mounting assembly and the parts in it can be serviced by unthreading the clamping ring 402. Unthreading or removing the clamping ring provides full access to the interior of the sensor mount assembly. However, even after removal of the clamping ring 402 and any service or repair procedures have been carried out, the relative position of the parts is important to maintain. Insuring correct positioning of the parts after repair or service is accomplished during the assembly sequence. The assembly sequence begins by attaching the upper sensor bracket 408 to an underside of the ceramic glass cooking surface using a room temperature vulcanisation silicone 1050. The RTV silicon is located in a circumferential groove 1051 located on an upper surface of the flange 1052 of the upper clamping bracket 408. Even before the vulcanisation or curing of the adhesive 1050, the lower sensor (405 may be engaged with the upper sensor bracket). Once the lower sensor bracket is threadedly engaged with the upper sensor bracket, the remainder of the parts 419, 608, 411, 410 etc are then assembled into position with the clamping ring 402 assembled last to complete the assembly. The clamping ring 402 is threaded into the internal threads of the lower cramping bracket 405 until a specified torque is reached. An exposed portion of the clamping ring 402, for example, the interior of the upper rim may be provided with openings or protrusions 1060 so that a tool may be affixed to the clamping ring 402 in order that it may be torqued to the specified level. Threading the clamping ring 402 into the lower clamping bracket 405 effectively draws or rotates the lower clamping bracket 405 into the internal threads of the upper clamping bracket 408.

As the lower clamping bracket threadedly advances into the upper clamping bracket 408, the torque is monitored until the target torque is reached. During this tightening process, the teeth 432 on the vertical arms 434 carried by the upper clamping bracket 408 engage teeth 432 form circumferentially around an exterior surface of the lower clamping bracket 405. The engagement of the teeth 432, 433 prevent the withdrawal of the lower clamping bracket 405 from the upper clamping bracket 408 by way of counter rotation or un-screwing. Thus, even when the clamping ring 402 is removed the lower clamping bracket 405 will not back away for the upper clamping bracket 408. In this way, the relative position of the parts in maintained even after repeated disassembly and reassembly.

It will be noted that the sensor cap 412 is retained in position within the upper sensor holder 410 by a clevis clip 1070. The clevis clip 1070 occupies a circumferential groove 1071 on an exterior surface of the sensor cap 412 and a groove 1072 located around the inside diameter of the upper sensor holder 410. The clevis clip 1070 is accessed through a radial opening 1073 located through a side wall of the upper sensor holder 412. Similarly, the upper sensor holder 410 is retained in position with respect to the lower sensor holder 409 by a second clevis clip 1080 that is inserted and accessed through a radial opening 1081 in the lower sensor holder 409. The second clevis clip 1080 occupies a first groove on an outer surface of the upper sensor holder 410 and an internal groove 1081 located about the internal bore of the lower sensor holder 409.

Figure 5:
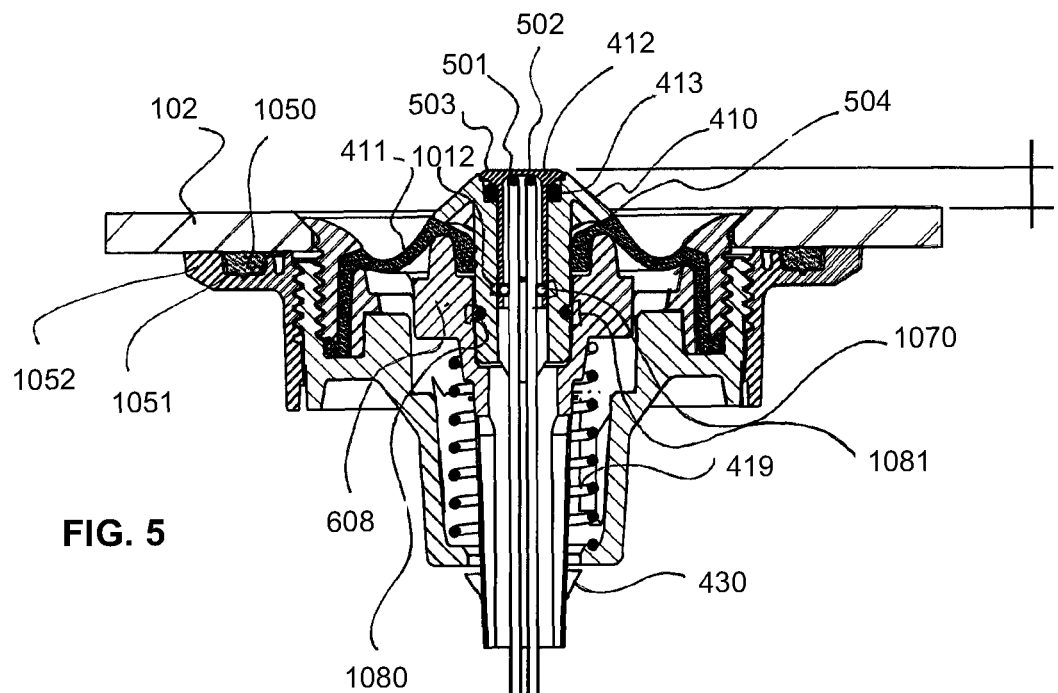
FIG. 5 is a cross sectional detail of a temperature sensor and sensor holder.

As shown in FIG. 5, in a rest position, the upper surface of the sensor cap is elevated above the upper surface of the cooking surface 102 by the action of the spring 419. Note that the upper holder presents a lower rim 504 that is below the upper surface of the cooking surface 102 even when the sensor assembly is in its uppermost position. By presenting a continuously chamfered or tapered outer surface whose rim 504 is below the cooking surface, pots and other cooking vessels will not catch on the upper holder and instead will slide over it so as to depress the moving parts of the sensor assembly to the flush orientation depicted in FIG. 6. Because of the spring 419, both sensors (such as NTC sensors) are able to make intimate contact with the underside of a cooking vessel because the cap 412 is conductive, one or more temperature sensors 501, 502 are located directly beneath the flat upper surface 503 of the cap and because the spring 419 is able to be compressed as shown in FIG. 6.

Figure 6:
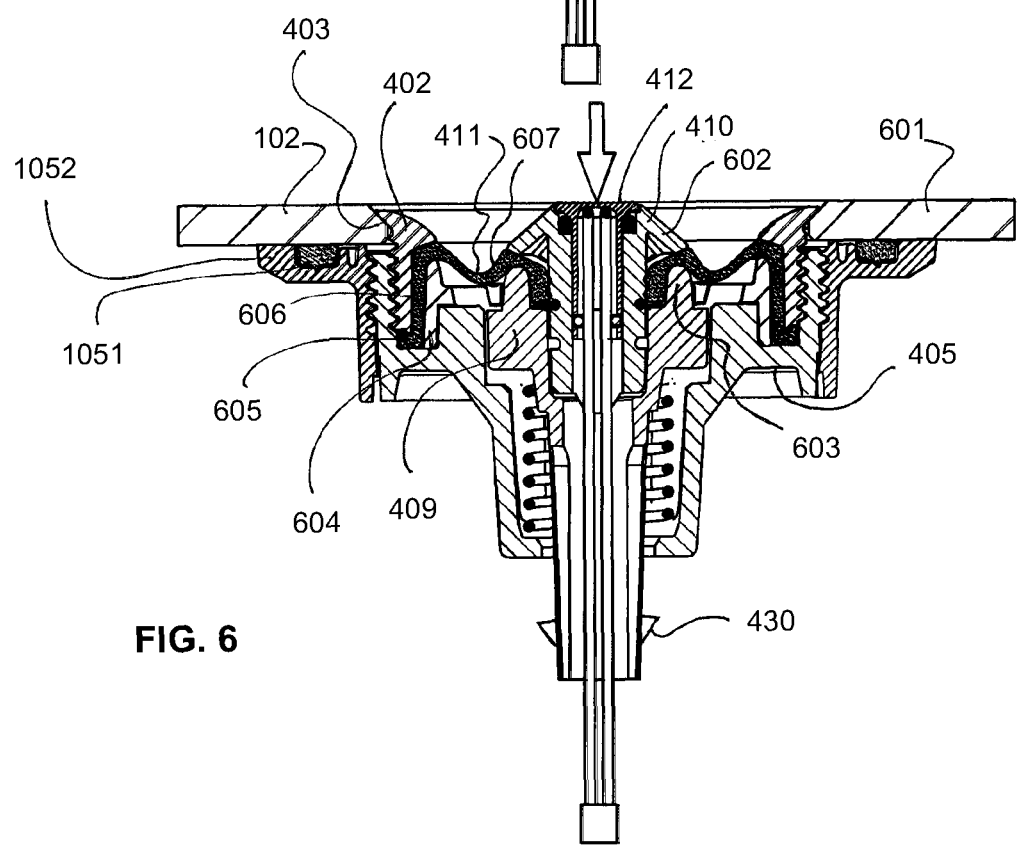
FIG. 6 is a cross sectional detail of a temperature sensor and sensor holder.

With reference to FIG. 6, it can be seen that when a cooking vessel is placed onto the cooking surface 102 it urges the cap 412 downwardly until it is flush with the upper surface of the cooking surface 102. Because cooking vessels are often slid into a central position on the cooking surface, the cap 412 together with the external surfaces of the upper sensor holder 410 form a continuous circumferential ramp or truncated cone whenever any part of the cap 412 or holder 410 are above the level of the upper surface 601. FIGS. 5 and 6 also illustrate how the elastomeric diaphragm 411 seals between the moving and the stationary parts of the sensor assembly 104. In this example, the inner rim of the diaphragm 411 is clamped between the upper holder 410 and the lower sensor holder 409. Thus, in this example, the upper holder 410 has an outward and downwardly extending rim 602 that makes contact with an upper surface of the diaphragm so that the diaphragm can be clamped between the rim 602 and an upwardly extending blunt ring 603 formed on an upper part of the lower sensor holder 409. The outer rim of the toroidal diaphragm 411 is contained and trapped between and inner surface of the clamping ring 402 and a clamping insert 604 that sits within and cooperates with the lower sensor bracket 405. In this example, the elastomeric sealing diaphragm 411 has a lower rim 605, a circumferential outer wall 606 that is retained between the insert ring 604 and the glass clamping ring, a convoluted central membrane 607 and an inner rim 608 that is retained in a circumferential groove that is radially inward of the lower sensor holder's clamping feature 603. Advancing the clamping ring 402 to the specified torque during assembly clamps the diaphragm's peripheries and creates a seal.

As shown in FIG. 7, the sensor assembly's clamping ring 402 has an upper flange 701 having a chamfered underside 702. The clamping ring may feature openings of other features 703 that allow the ring to be unscrewed from the lower bracket 704. In this way, the elastomeric diaphragm 705 as well as the lower holder 409, upper holder 410 and spring 419 can be removed through the top of the cooking surface 102. This allows for the serviceability of at least the removable parts. It should be noted that the upper flange 701 of the clamping ring is larger in diameter than the threaded exterior of the clamping ring but smaller in diameter than the maximum diameter of the edge of the cooperating chamfer 710 formed in the cooking surface 102. As shown in FIG. 8, this arrangement allows the upper most surface of the flange 701 to have an installed and usable position that is lower than the upper surface of the cooking surface 102. From FIGS. 7 and 8 it can also be appreciated that the elastomeric diaphragm 705 is retained by screwing the clamping ring 402 into the internal threads of the lower bracket, preferably so that a projecting lower rim 720 of the clamping ring enters a circumferential groove 721 formed between the sidewall and the lower rim of the diaphragm. FIG. 8 also illustrates that as an alternative, the clamping ring 801 may have an upper flange 802 that terminates above the cooking surface 102. It preferably has a chamfered edge 803 so that cooking vessels can easily slide across the upper surface of the flange 802.

Figure 9:
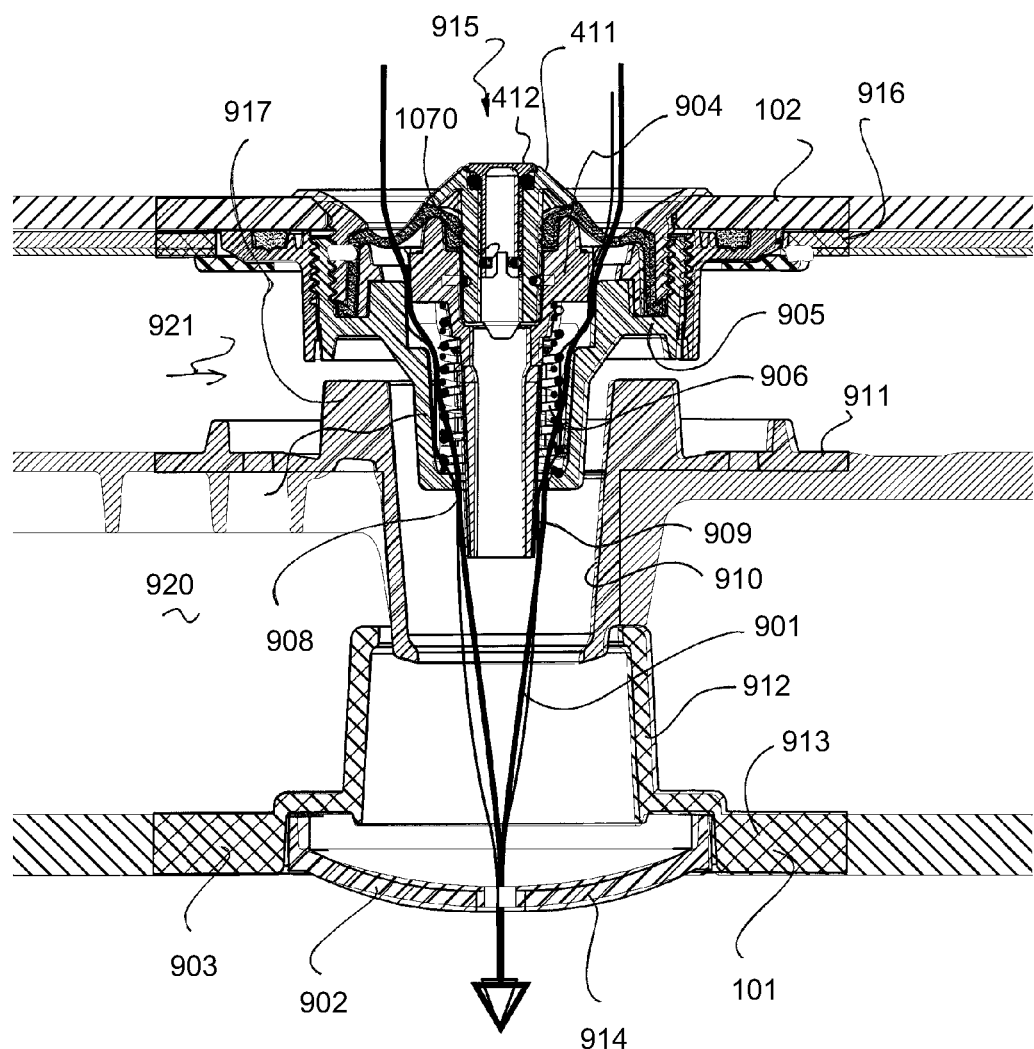
FIG. 9 is a cross sectional detail of a temperature sensor and sensor holder.

As shown in FIG. 9, the aforementioned sensor assembly and method of mounting it with respect to the cooking surface, allow for the provision of a liquid flow path 901 that extends from above the cooking surface 102 to a location below a discharge opening or vent 902 located on an underside 903 of the case or body 101. This is provided for in the event that the elastomeric diaphragm 411 is inadvertently penetrated or if it fails. As illustrated in FIG. 9, the flow path 901 (below the diaphragm 411) passes through a gap located between the reciprocating lower sensor holder 904 and the lower bracket 905. The uninterrupted vertical flow path continues through the interior 906 of the lower bracket and through a second gap 908 located between and opening in the lower part of the lower bracket 905 and a cylindrical body portion 909 of the lower sensor holder that passes through the opening 908 in the lower bracket 905. In this example, the flow path also extends through a cylindrical channel 910 formed in an intermediate chassis component 911 within the case that discharges into a cylindrical collector 912 associated with the case's lower surface 913. The flow path contains no area where liquid can accumulate. In this example, the discharge opening in the case 101 has a protective, perforated cover 914 that can be removed so as to access the interior of the case. Note that the flow path 901 allows fluids to flow from above the cooking surface 102 to a discharge below the device, utilising only gravity to promote the flow of liquids through the device in a way that does not interfere with the induction coil, the cooling airflow or any of the internal electrical components associated with the device.

The same arrangement creates an airflow path that effectively cools the sensor assembly 915 the internal space within the case particularly around the induction coil heating element 916. An internal channel or chassis component 911 has an elevated wall or moat 917 around the fluid flow path and interior wall 910 of the channel. The raised rim or wall 917 permits air to flow in close proximity to and even through the sensor assembly 915 while avoiding water ingress into the compartment 920 below the plenum 911 by way of the open airflow path 921. This same arrangement also prevents fluids inadvertently entering past the diaphragm 411 from being entrained in the airflow 921. Note the nesting and concentricity between the sensor assembly 915, the channel 910 and the protective shroud 912. This allows for the creation of separate air and fluid flow paths that potentially intersect with one another but do not interfere with one another.

Figure 10:
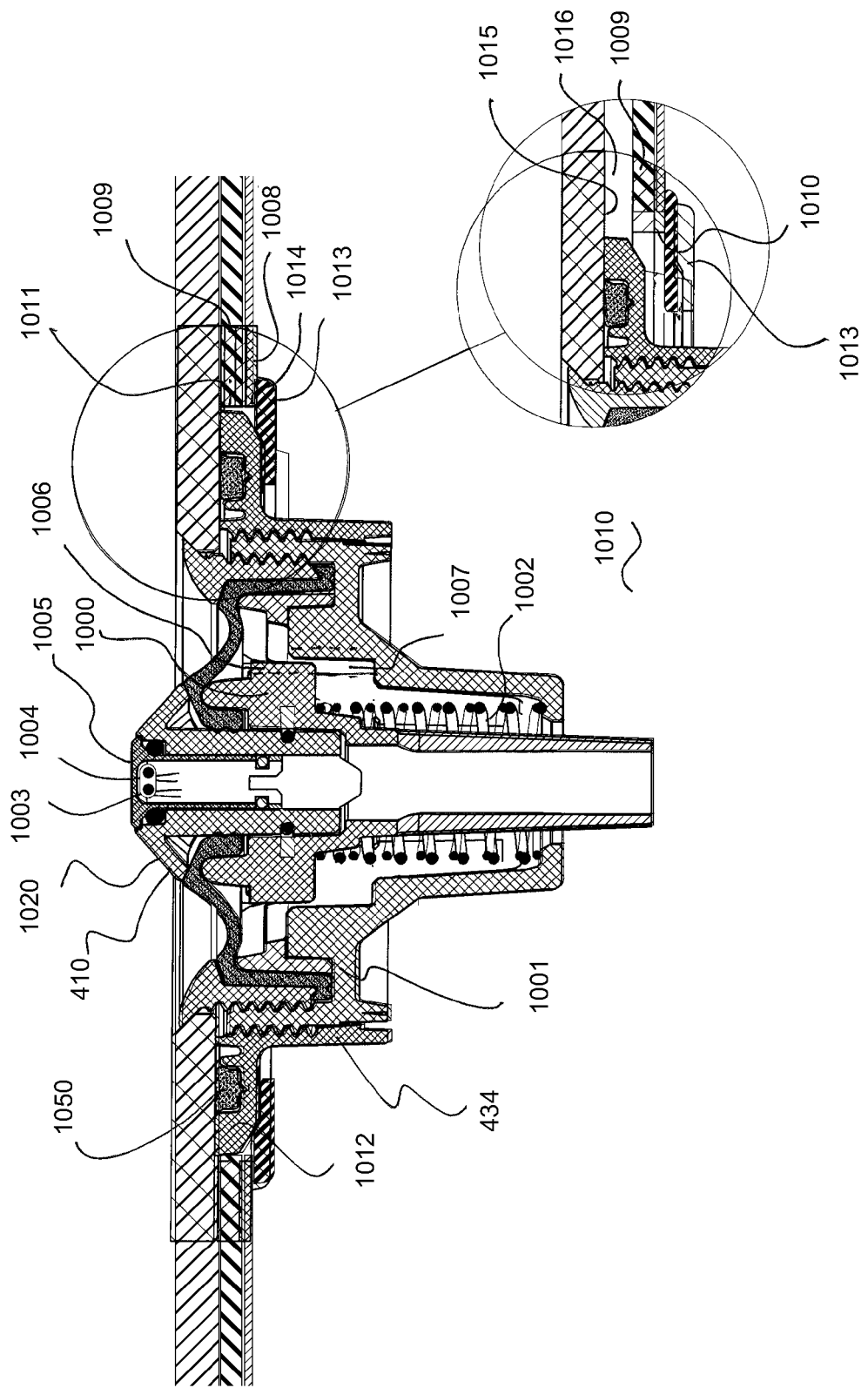
FIG. 10 is a cross sectional detail of a sensor and sensor holder.

As shown in FIG. 10, the lower holder 1000 moves vertically relative to the lower bracket 1001. It may be guided by the flat cylindrical surfaces of the brackets or by optional interdigitating ribs or fins 1006, 1007. This vertical motion, biased upwardly by the spring 1002 is important for maintaining the pair of sensors 1003, 1004 intimate thermal communication within a vessel that is in contact with the cap 1005. However, rotational movement between the lower holder and the lower bracket is preferably avoided. To prevent or limit the rotation between the two parts, the lower holder 1000 may be provided with vertical fins 1006 on an exterior surface. These vertical fins cooperate with inward facing vertical fins 1007 formed on an inner surface of the lower bracket. Pairs or inner and outer cooperating fins may be provided in any number, as required to maintain low friction vertical sliding between the parts. FIG. 10 also illustrates two different methods for retaining an insulation layer 1008 between the induction coil heating element 1009 and the electronic and other components that may be located in the interior 1010 of the cooker. In this example, a mica sheet or another stable insulator is provided in a shape that corresponds approximately to the outer perimeter of the cooking surface and that has an internal opening loll for accommodating the radially outward most parts of the temperature sensing assembly, for example, the outer diameter of the upper bracket 1012. In this example, an insulation inner rim retaining shelf 1013 is located within the compartment 1010. In this example, the shelf 1013 is carried by the upper bracket 1012 or alternately affixed to it or spaced from it in a predicable way. In the example provided in FIG. 10, the shelf 1013 provides a mechanical support to the inner rim 1014 of the insulation 1008 without being affixed to it or adhered to it. By resting on the shelf 1013, the insulating sheet or layer 1008 can move relative to the shelf 1013, without creating unnecessary stresses in the insulation. If required, the spacing between the shelf 1013 and the underside 1015 of the cooking surface can be large enough so as to create an air gap or spacing 1016 between the underside of the cooking surface 1015 and the induction coil 1009. This air gap can form part of the induction coil's cooling air flow path as shown in FIG. 3.

FIG. 10 also illustrates that the upper sensor holder 410 forms a bumper in the form of a truncated cone. The cone shape allows a cooking vessel to slide over the sensor holders 410, 412 and depress them.

Figure 10A:
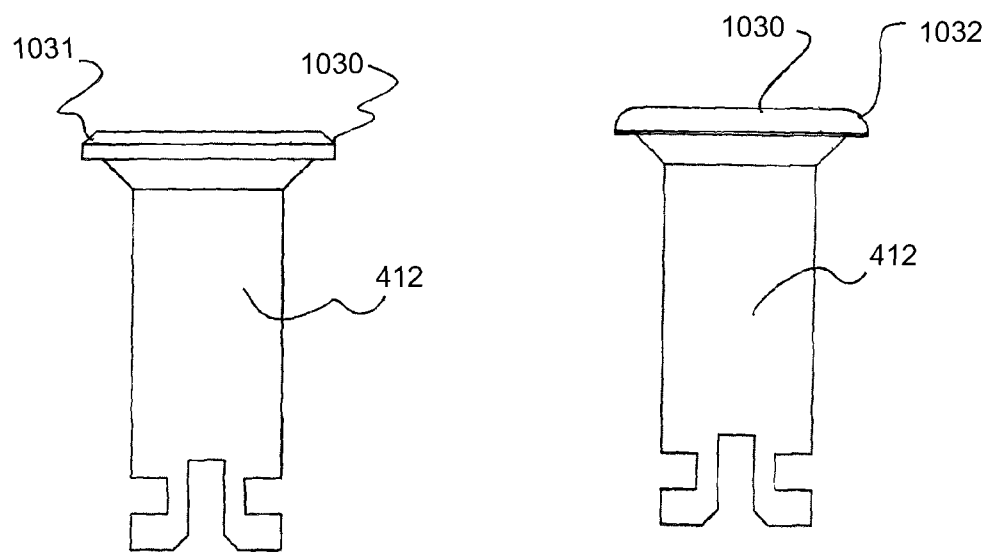
FIG. 10A illustrates two styles of temperature sensor carrier.

As shown in FIG. 10A, the upper sensor holder 412 has an enlarged head 1030. To facilitate the movement of cooking vessels into engagement with the head 1030 the outer rim of the head 1030 may be optionally chamfered 1031, or radiused (or curved) 1032.

Figure 10B:
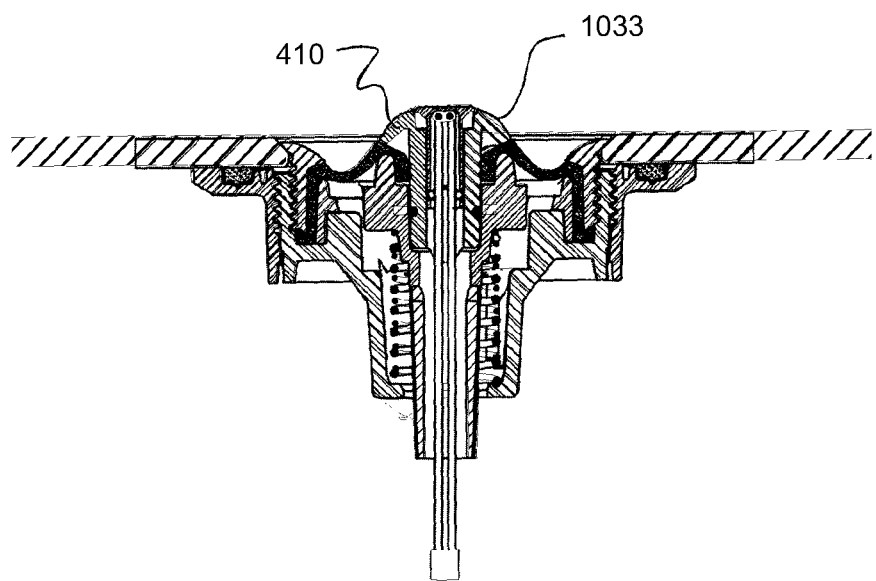
FIG. 10B is a cross sectional view of a temperature sensor mount assembly having a domed upper sensor holder.

As shown in FIG. 10B, the lower sensor holder 410 may comprise a truncated cone as shown in FIG. 10 or comprise a dome, bulge or mound with sides curved in a vertical plane 1033.

Figure 11:
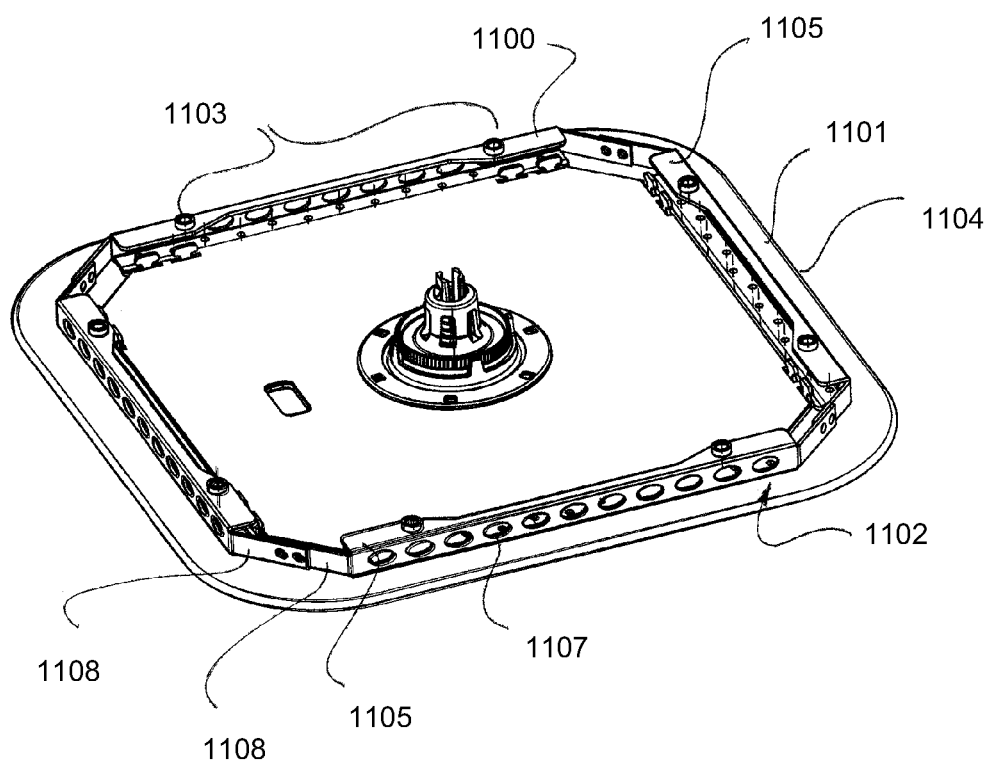
FIG. 11 is an inverted perspective view of a cooking surface for an induction cooker.

As shown in FIG. 11 a fixing bracket assembly 1100 is adhered to an underside 1101 of the ceramic glass cooktop surface 1102. The bracket assembly allows for the provision of, for example, eight internally threaded screw (or other fastener) fixing positions 1103 inward or the outer rim 1104 or the surface 1102. The screw fixing positions 1103 receive fasteners that can be removed for the purpose of better servicing, replacing or maintaining of the surface 1102 or component that may be below it. In this example, the bracket assembly comprises four individual, straight aluminium brackets 1105. Aluminium is used because it is rigid, stable and not ferromagnetic. Each of the aluminium brackets 1105 is in the shape of a C-shaped channel. The channel may be perforated 1107 for better cooling and airflow. Each bracket has axial limbs or extensions 1108 that may be affixed to one another so as to form a continuous frame when adjacent tab or legs 1108 are affixed to one another.

Figure 12:
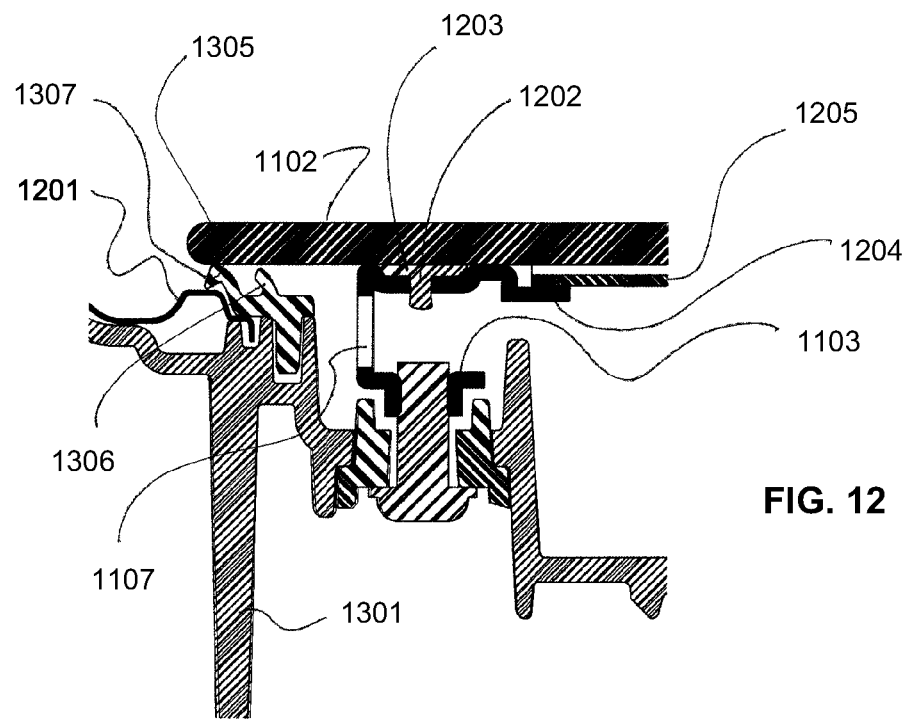
FIG. 12 is a schematic cross sectional drawing of a cooking surface attached to a chassis of an induction cooker.
Figure 13:
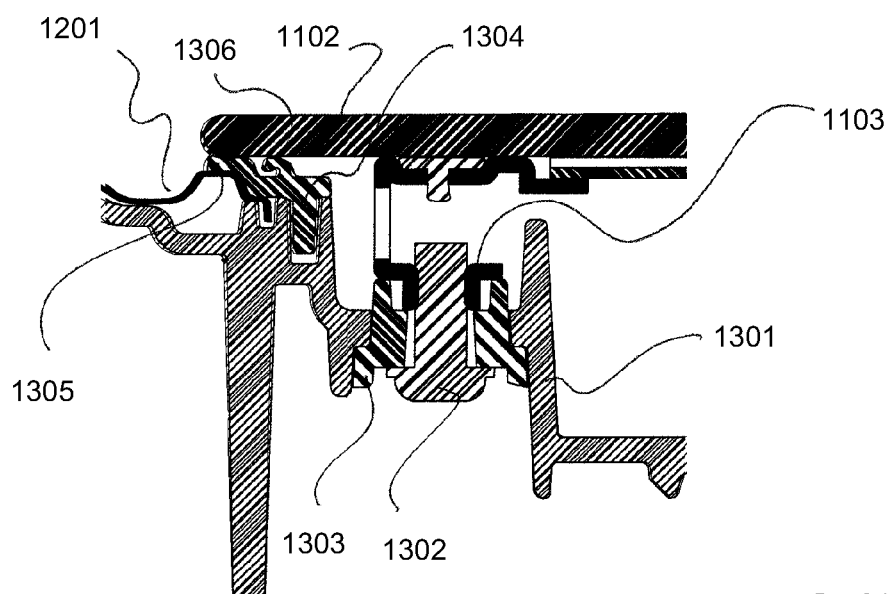
FIG. 13 is a schematic cross sectional drawing of a cooking surface attached to a chassis of an induction cooker.

The threaded openings 1103 associated with the cooker surface 1102 are used to retain the cooktop surface 1102 to an upper margin of the shell or case 1201 as shown in FIGS. 12 and 13. As previously mentioned an adhesive 1202 may be used to adhere the brackets or bracket assembly 1105, 1100 to the top 1102. In this example, an underside of the bracket is provided with a longitudinal channel 1203 that allows the edges of the bracket to either side of the channel to make direct contact with the underside of the surface 1102. Openings through the underside of the bracket allow the adhesive 1202 to have more surface area contact with the bracket or bracket assembly. The bracket is depicted as having an interior lip 1204 that is generally parallel with the underside of the surface 1102 and that defines a gap below the underside of the top 1102. This gap contains the outer rim of the insulation layer 1205 located below the induction coil. The inner rim of the insulation layer is supported in the manner suggested by FIG. 10. Thus, the insulation layer is maintained in registry with the induction coil but is free to expand and contract without binding or requiring fasteners or adhesives to mount it.

FIGS. 12 and 13 also illustrate how the top 1102 is affixed to the device's chassis 1301. As illustrated, a threaded fastener 1302 in registry with opening in the bracket passes through an optional guide, support, opening, slot or washer that is retained by the chassis 1301. Tightening the threaded fastener 1302 draws the top 1102 toward the chassis 1301.

In preferred embodiments a liquid and air impermeable seal 1304 is maintained between the chassis 1301 or the chassis' shell or case 1201 and the top 1102. In the examples depicted in FIGS. 12 and 13, this circumferential seal below the top 1102 comprises two upper sealing lips 1305, 1306, a longer lip 1305 being located radially outward of a smaller lip 1306. The outer lip 1305 has an outer rim 1307. As the fastener 1302 is rotated, the outer sealing lip 1305 is compressed to form a primary seal between the shell 1201 and the top 1102. A second sealing engagement is formed between the inner lip 1306 and the underside of the top 1102. Other sealing arrangements are contemplated.

The shelf 1204 may be formed by bending a tab into a horizontal orientation as shown in FIG. 12. In this way, the insulation can be installed and then the tab 1204 bent over to form the shelf 1204.

As shown in FIG. 14, the base or underside chassis component of an induction cooker has grill covered vent openings 201, 202 (as shown in FIG. 2) an enclosed fan 1402 draws air through one of the openings 202. The enclosed fan discharges air into an enclosed channel 1403. The channel 1403 comprises a lower component 1404 and a cover 1405. The lower component 1404 is preferably an aluminium heat sink with spaced apart fins onto which is mounted heat sensitive circuit components such as IGBT semi-conductors 1406 and a grid component semi-conductor 1407. The semi-conductors 1406, 1407 may be mounted on an underside of the lower component 1404. The upper surface of the lower component comprises longitudinal and generally parallel fins 1501 (see FIG. 15) that extend in the direction of air flow. The upper component 1405 forms a cap that together with a lower component 1404 forms an airflow channel or path that leads from the discharge of the fan 1408 to an exit or air discharge opening 1409 adjacent to but preferably interior of an end wall 1410 in which are formed discharge vent openings 1411.

Figure 15:
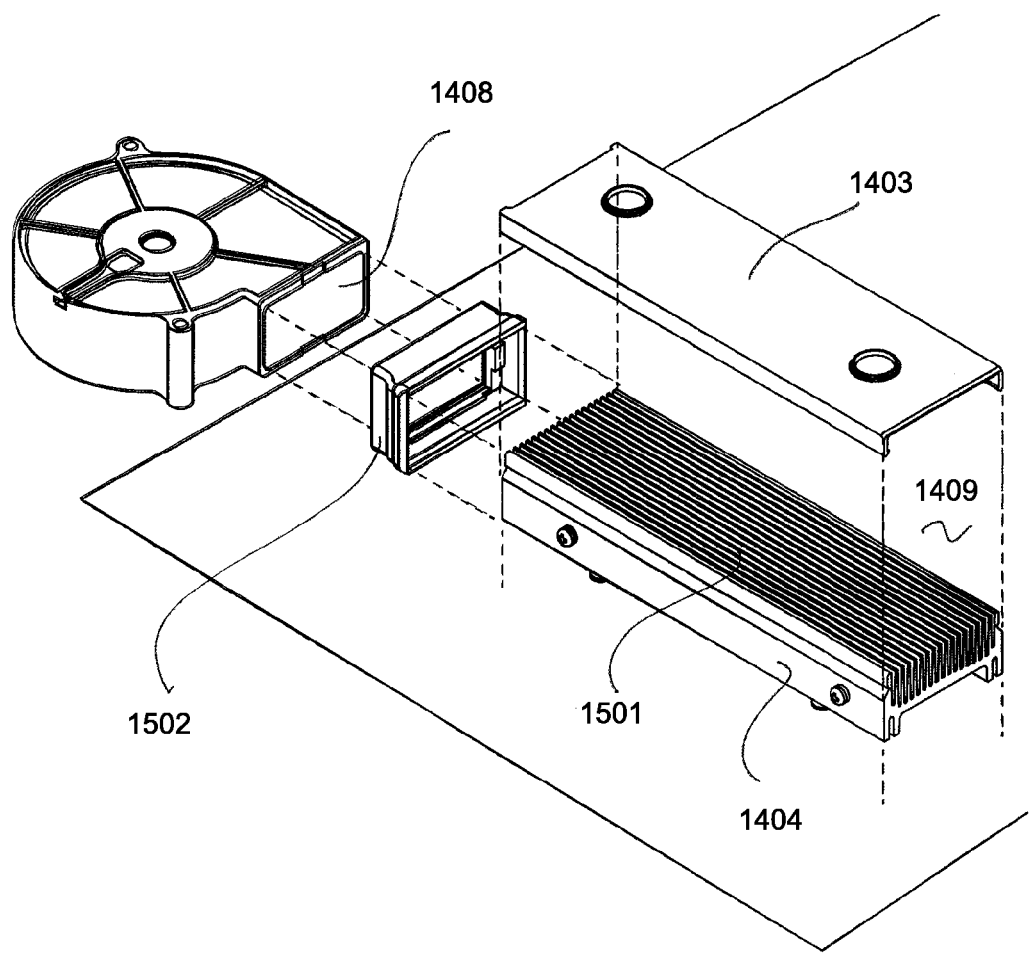
FIG. 15 is an exploded perspective of a fan and air flow path for an induction cooker.

As shown in FIG. 15, the fan's discharge opening 1408 is coupled to the airflow path created by the upper and lower components 1404, 1405 by a polymeric boot or adaptor 1502 that mechanically couples the discharge opening 1408 with the flow path. In this way, a cooling airflow path associated with the induction coil does not co-mingle or share an air path with the cooling airflow path associated with the semi-conductors 1406, 1407. The adaptor 1502 is preferably elastomeric so as to seal efficiently against both the fan 1402 and the assembly that includes the upper and lower components 1403, 1404.

Figure 16:
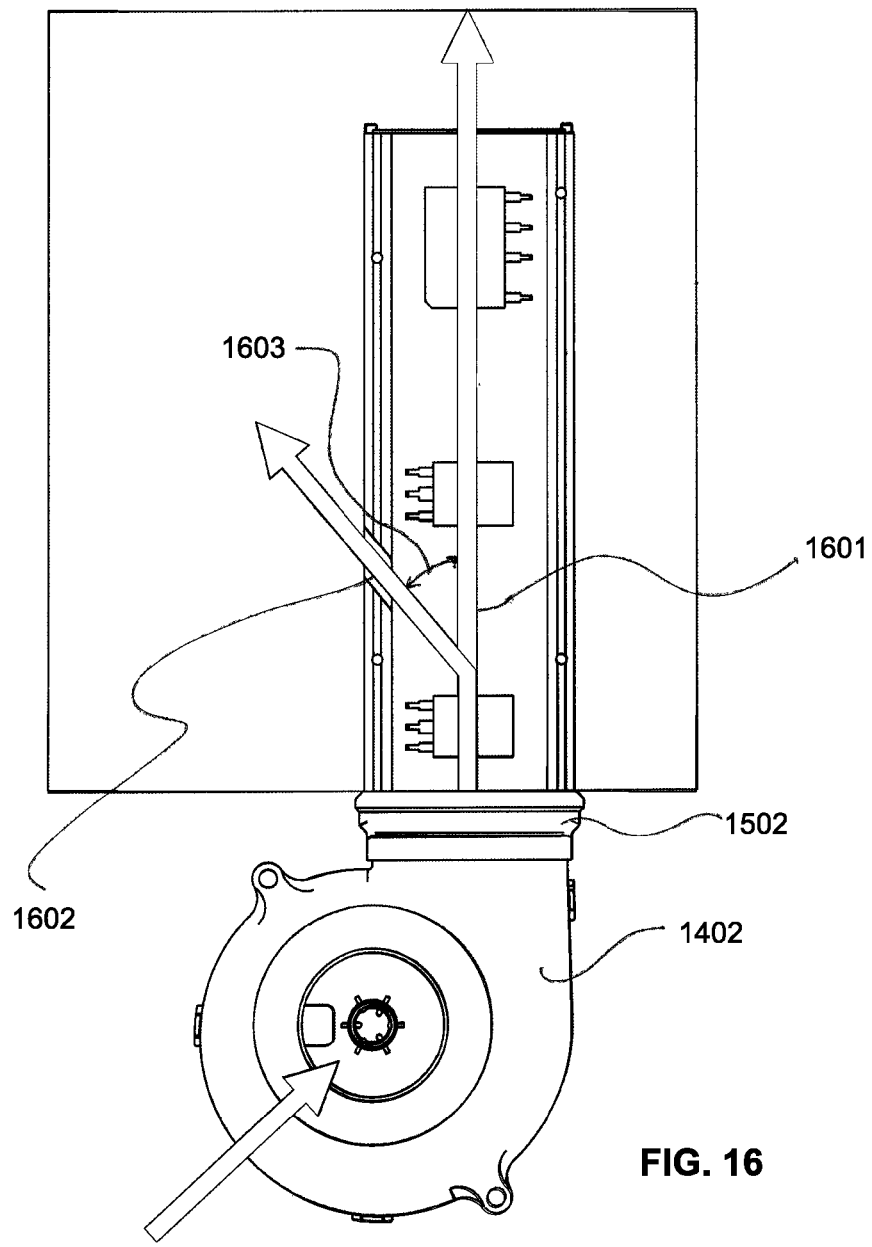
FIG. 16 is a plan view of an air flow path, fan and auxiliary outlet for an induction cooker.

As shown in FIG. 16, the cooling airflow path 1601 defined by the heat sink and its cover 1404, 1403 may include an auxiliary air outlet port 1602. In this example, the auxiliary outlet port 1602 is formed at an angle 1603 relative to the channel and generally linear flow path 1601. The auxiliary outlet 1602 may be used to collect cooling air for other purpose or to moderate the airflow occurring in the main cooling path 1601.

Figure 17:
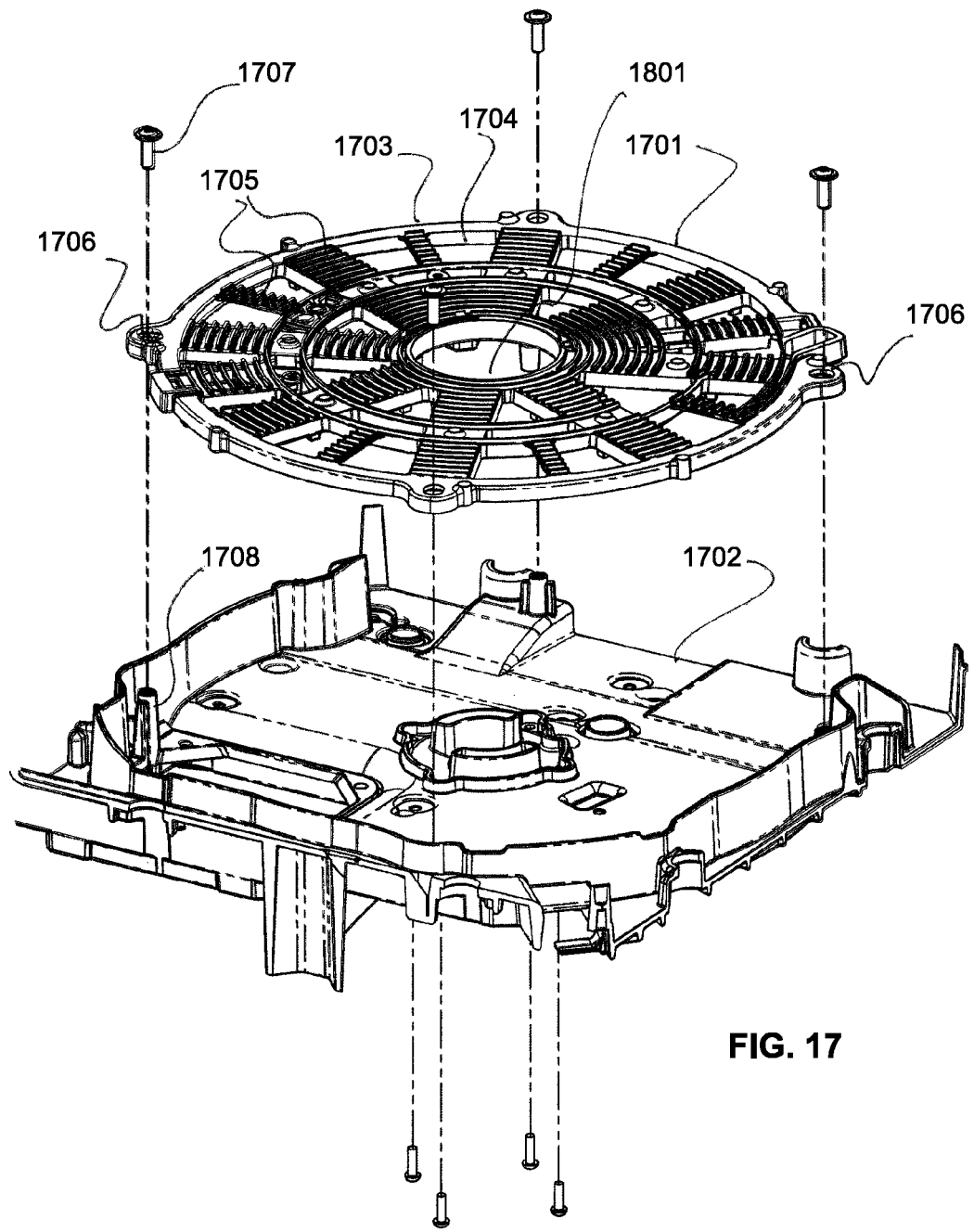
FIG. 17 is an exploded perspective view of an induction coil assembly and chassis.
Figure 18:
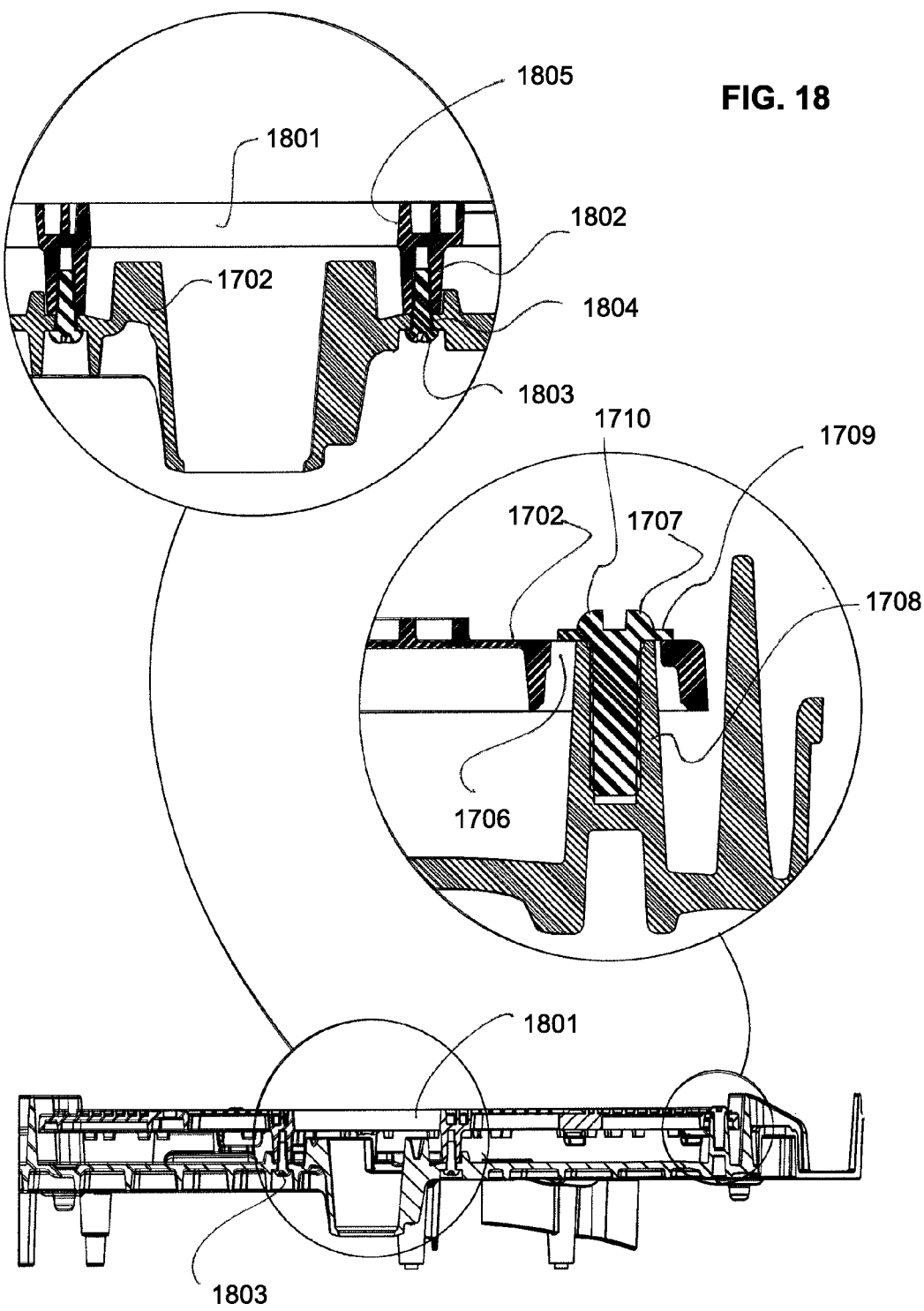
FIG. 18 is a cross sectional diagram of an induction coil and its mounting to a chassis.

As shown in FIGS. 17 and 18 the induction coil assembly 1701 is mounted to the chassis or an intermediate chassis component 1702 so as to minimise the effect of the thermal expansion and contraction of the induction coil assembly 1701. In this example, the induction coil assembly 1701 comprises (for example) a generally circular substrate 1703 in which is formed cooling openings 1704 and a spiral track 1705 for receiving and supporting the twisted copper wire induction element. As shown in FIGS. 17 and 18, the outer rim or periphery of the substrate 1703 features through openings 1706 for receiving fasteners 1707 that go through the openings 1706 and are received by fixing points or posts 1708 on the chassis component 1702. As shown more clearly in FIG. 18, the through openings 1706 are elongated, or longer at least in a radial direction than either the fastener 1707 or their fixing points 1708, creating a radial clearance so that the substrate 1703 is free to expand in a radial direction without stressing the chassis 1702 or the fixing point or post 1708. So as to engage with the lateral sides of the opening or slot 1706, the fastener may have a flange or washer 1709 under the head 1710. Because the degree of thermal expansion of the substrate 1703 is less about the inner periphery, the inner circumference, being a portion of the substrate that surrounds its central opening 1801, may be affixed by providing the substrate with downward facing bosses that are internally threaded to receive fasteners 1803. The fasteners 1803 may pass through openings 1804 with merely a sliding fit so that there is little or no relative movement between the boss 1802 and the chassis or chassis sub-component 1702. This arrangement essentially fixes the inner rim 1805 of the substrate while allowing the outer rim to expand and contract relative to the fixing points 1708.

Figure 19:
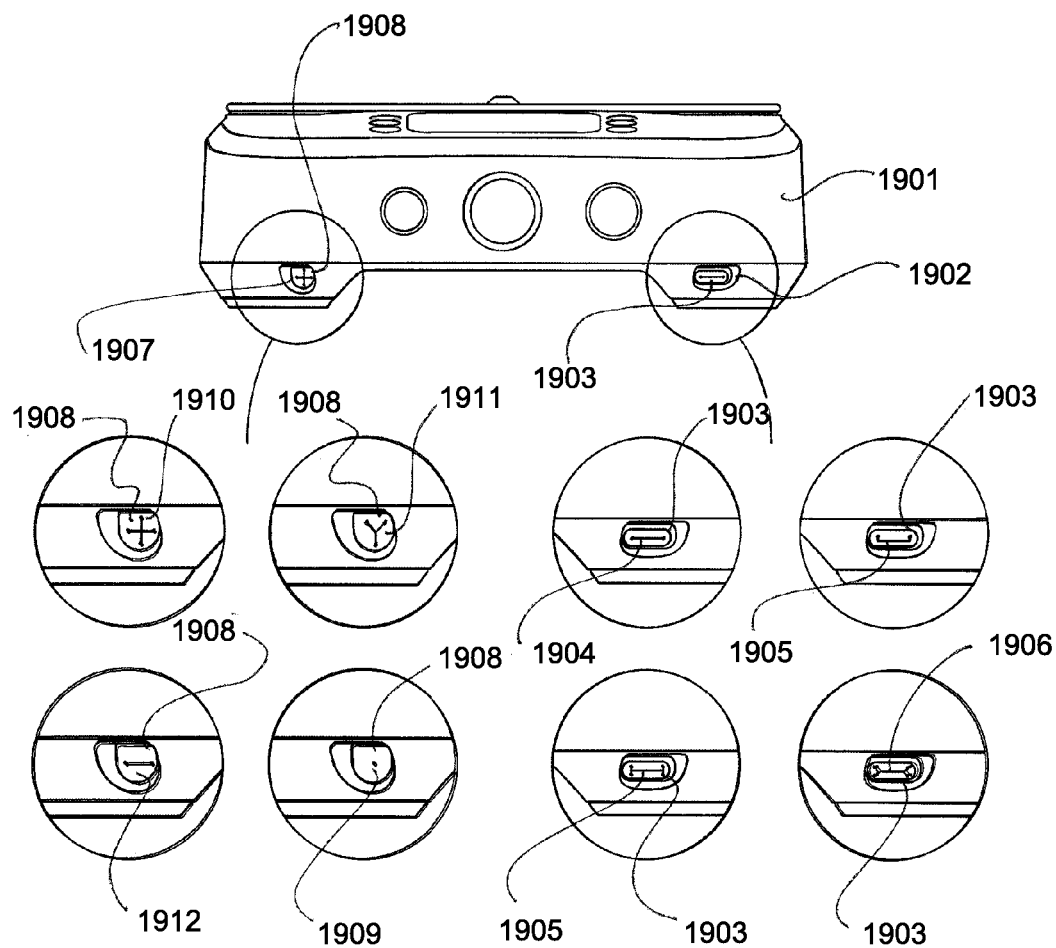
FIG. 19 is a plan view of an induction cooker illustrating sealing membranes.
Figure 20:
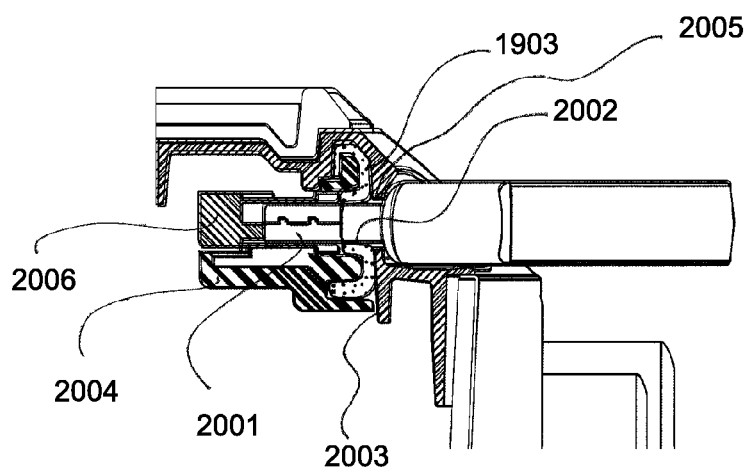
FIG. 20 is a cross sectional view of a sealing membrane and USB connection.

As shown in FIG. 19, a kitchen appliance or other appliance such as an induction cooker may be provided with externally accessible ports adapted for the insertion of the male portion of a USB cable or other electrical connection such as a 3.5 mm jack. In this example, the appliance 1901 is provided with a recessed port 1902 for receiving a male USB connector. The port has a water resistant cover being a flexible elastomeric membrane 1903. So that the membrane can allow the USB connector to pass through it, the membrane is through penetrated with one or more incisions-or slots. The slot or slots do not form a permanent opening, but flex so as to allow the connector to pass through, preferably maintaining a water resistant seal around the connector, particularly when the connector is engaged with the cooperating connector behind the membrane 1903. The slot may be a straight or linear slot 1904, a "U" shaped slot 1904 having linear upright and transverse portions, and "H" shaped slot 1905 or a straight slot, terminated at each end with "V" shaped portions 1906. As shown in FIG. 20, the protective membrane 1903 flexes as the USB connector 2001 is inserted. The parts of the membrane that are adjacent to the slot or arrangement of slots flexes so that flexed leg or flap 2002 is formed. The flap 2002 makes surface contact with an exterior portion of the connector 2001 so as to create a seal. In this example, the flap is trapped between and internal face of the device's chassis 2003 and a mounting bracket 2004. Thus, the connector 2001 passes through an opening 2005 in the chassis before penetrating the flexible membrane 1903, finally making contact with the cooperating female style USB connector 2006.

Figure 21:
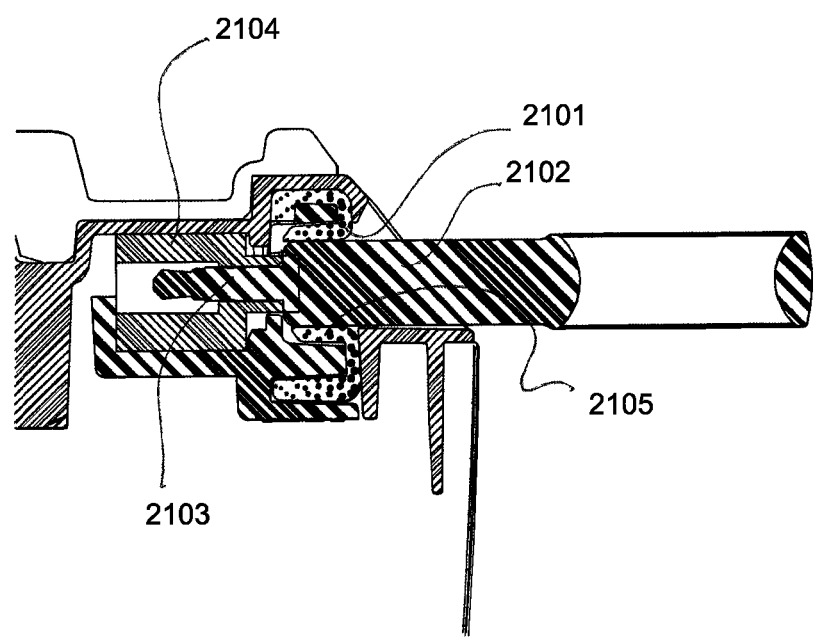
FIG. 21 is a cross sectional view of a sealing membrane and jack arrangement.

Similarly, and as shown in FIGS. 19 and 21, a receptacle or female jack for a pin like electrical connector such as a 3.5 mm plug comprises a preferably recessed port opening 1907 that is protectively and sealingly covered by a flexible membrane 1908. The membrane 1908 may have a single point-like, but flexible opening 1909 for admitting the tip of the plug. In the alternative, it may have a network of intersecting linear slots 1910, a network comprising a "Y" shaped slot 1911 or a single slot 1912. As shown in FIG. 21, the point or slot-like perforations of the membrane bend, flex 2101 or accommodate the body 2102 of the plug, thereby allowing the tip 2103 to make electrical contact with a cooperating socket or electrical connection 2104. The flexing of the membrane creates a return, leg or flap 2105 that fold inwardly so as to make surface contact with the body of the plug 2102 and create a seal around it.

Figure 22:
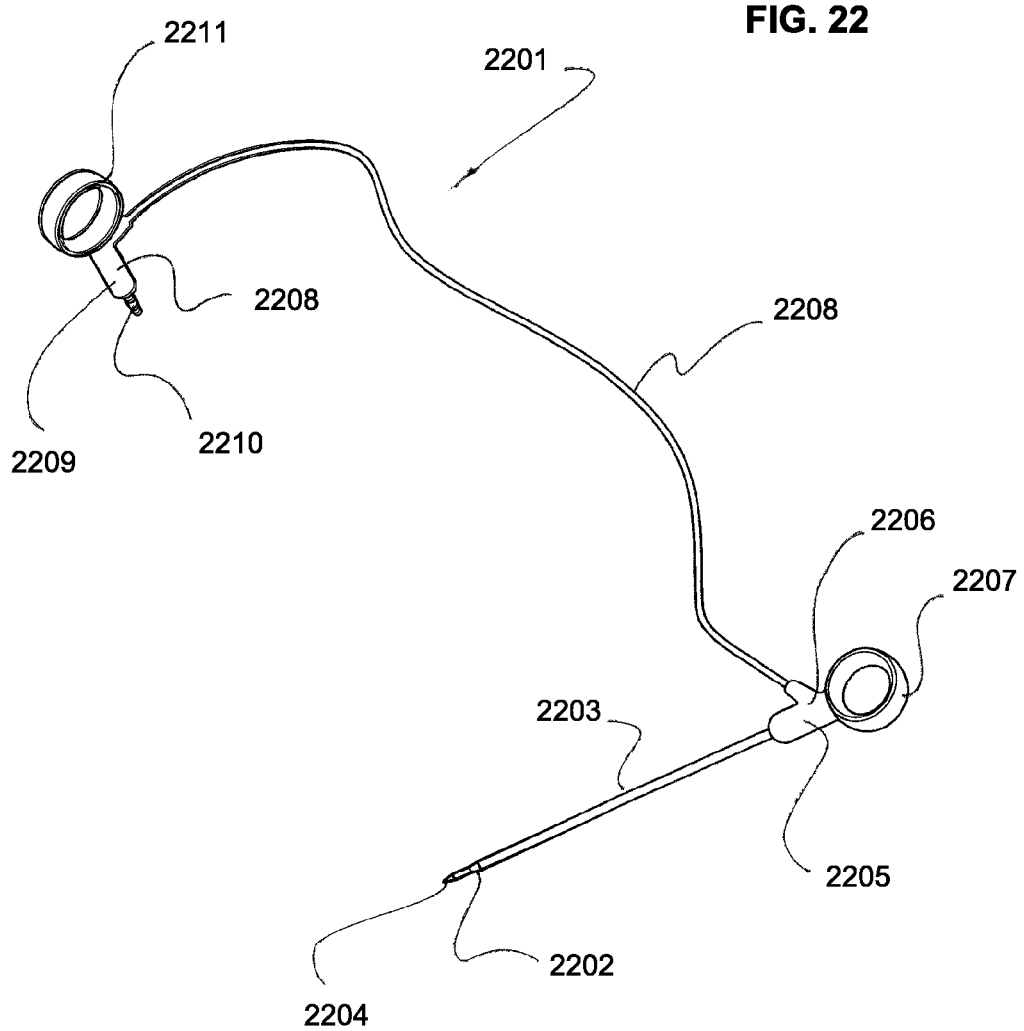
FIG. 22 is a perspective view of a temperature probe.

As shown in FIG. 22, an electrical plug of the kinds shown in FIG. 21 may be incorporated into a temperature probe 2202. The probe comprises a temperature sensor 2202 forming a part, such as the tip, of a stem 2203 having a pointed tip 2204 that is adapted to penetrate common food stuffs. The stem 2203 is carried by a probe handle 2205. The handle 2205 comprises a body portion 2206 and a ring or ring-like end 2207. The handle is preferably formed from a polymer. An electrical cable 2208 extends from the probe's handle to the probe's plug assembly 2208. The plug assembly 2208 has a body 2209 from which extends an electrically conductive tip or plug 2210 such as a 3.5 mm, multiple conductor plug. The plug body 2209 terminates in a ring 2211. The centre of the ring 2211 is in axial alignment with the tip 2210. Similarly, the probe's ring 2207 is in axial alignment with the probe's pointed tip 2204. When plugged into its socket or receptacle 1907, the probe communicates temperature data to the device's microprocessor. This real time temperature data can be utilised in a number of ways in the preparation or cooking of foods by the device.

Figure 23:
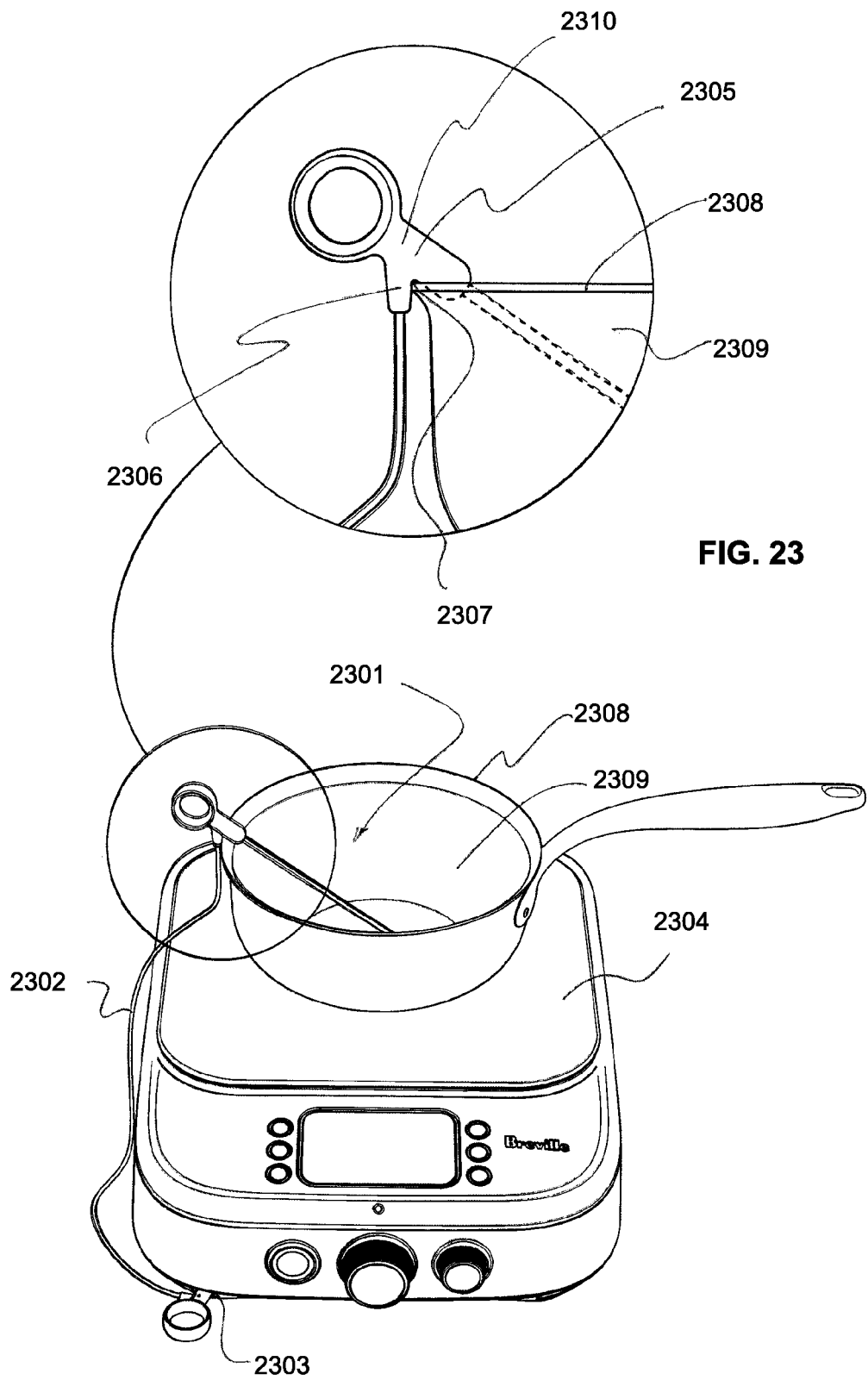
FIG. 23 is a perspective view of an induction cooker and temperature probe.

As shown in FIG. 23, the temperature probe 2301 is connectable by its cord or cable 2302 to a port 2303 carried by or associated with the induction cooking appliance, or another appliance 2304. The body 2305 of the probe's handle has a projecting limb 2306. The gap or corner between the limb 2306 and the main part of the body 2305 forms a saddle 2307. The saddle 2307 is adapted to fit over a rim 2308 of a cooking vessel 2309 so that the probe handle can rest on or engage the cooking vessel 2309 or rest on it without human intervention. In this example, both the probe's main body 2310 and limb 2306 are generally cylindrical or tapered cylinders.

Figure 24:
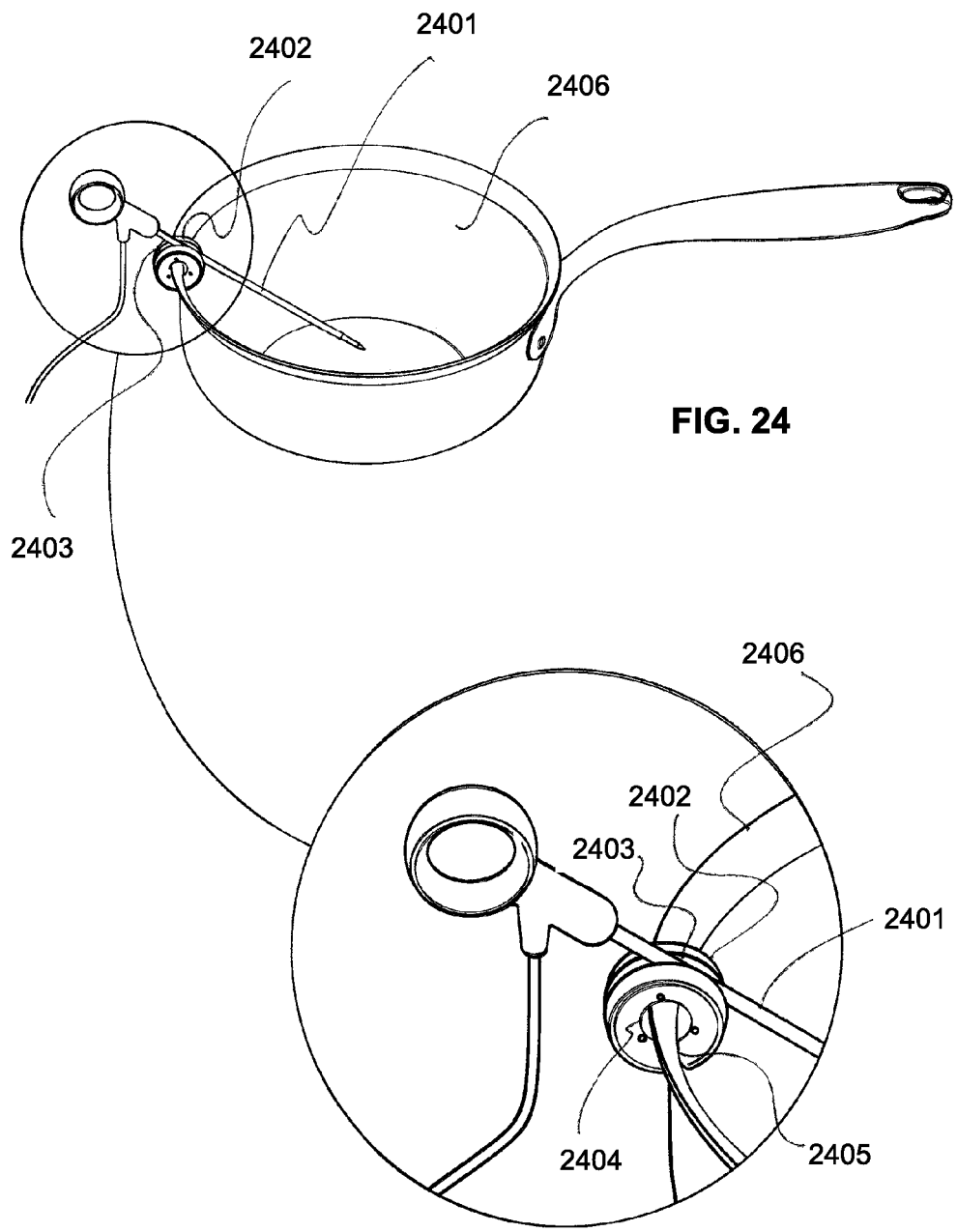
FIG. 24 is a perspective view of a temperature probe holder.

As shown in FIG. 24, the temperature probe 2401 may also be carried or supported by a probe holder 2402. The probe holder of this example is a split elastomeric ring having a circumferential groove 2403 for snugly receiving the stem of the probe 2401. In this example, the holder is in the form of a disc with a central opening 2404. The cap or split 2405 in the holder allows the holder to flex so as to accommodate the rim or sidewall of a cooking vessel 2406.

Figure 25:
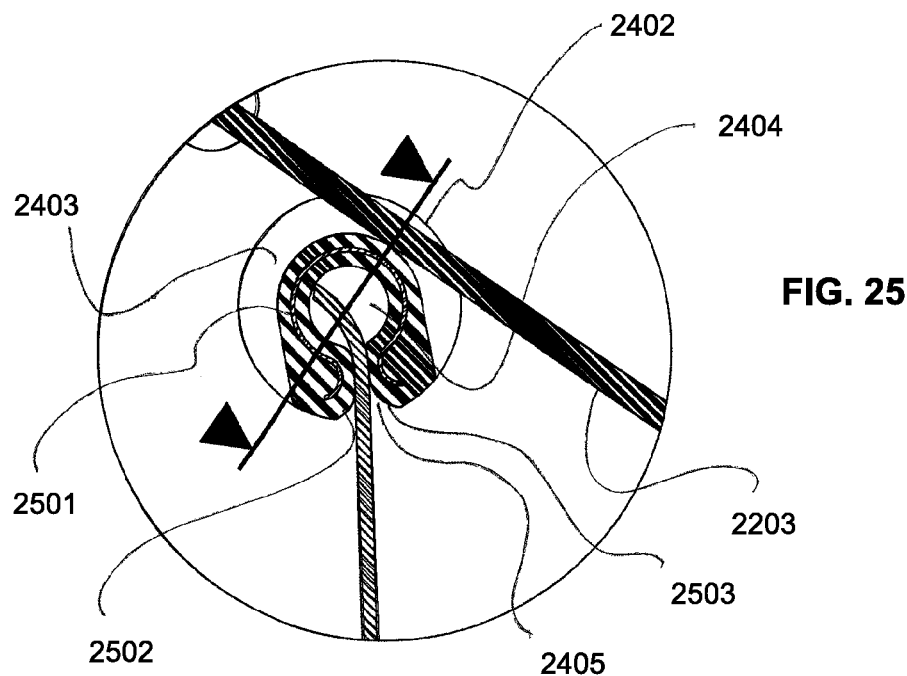
FIG. 25 is a cross sectional view of a temperature probe holder.
Figure 26:
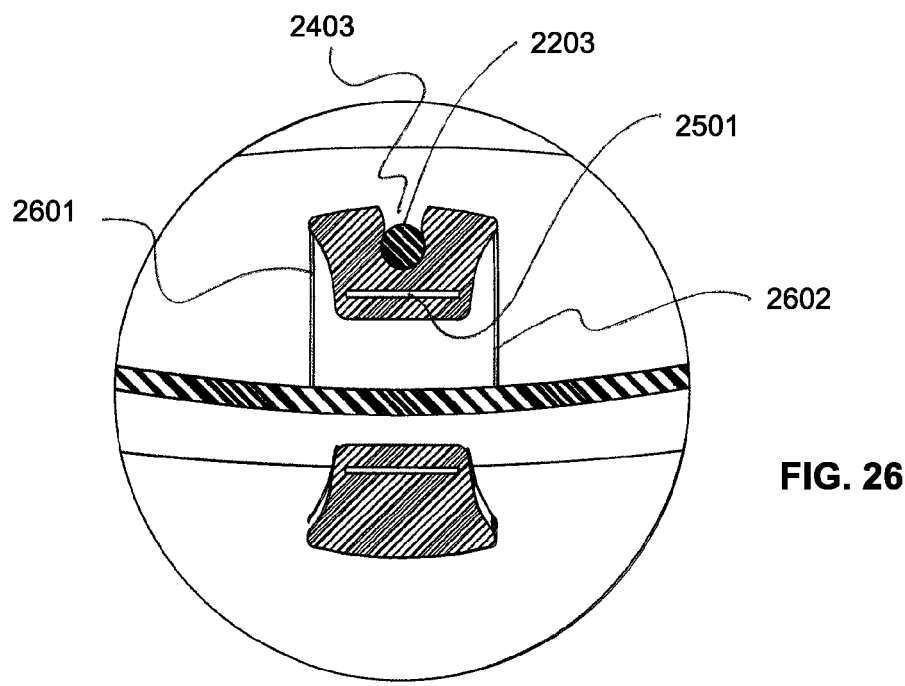
FIG. 26 is a cross sectional view of a temperature probe holder.
Figure 27:
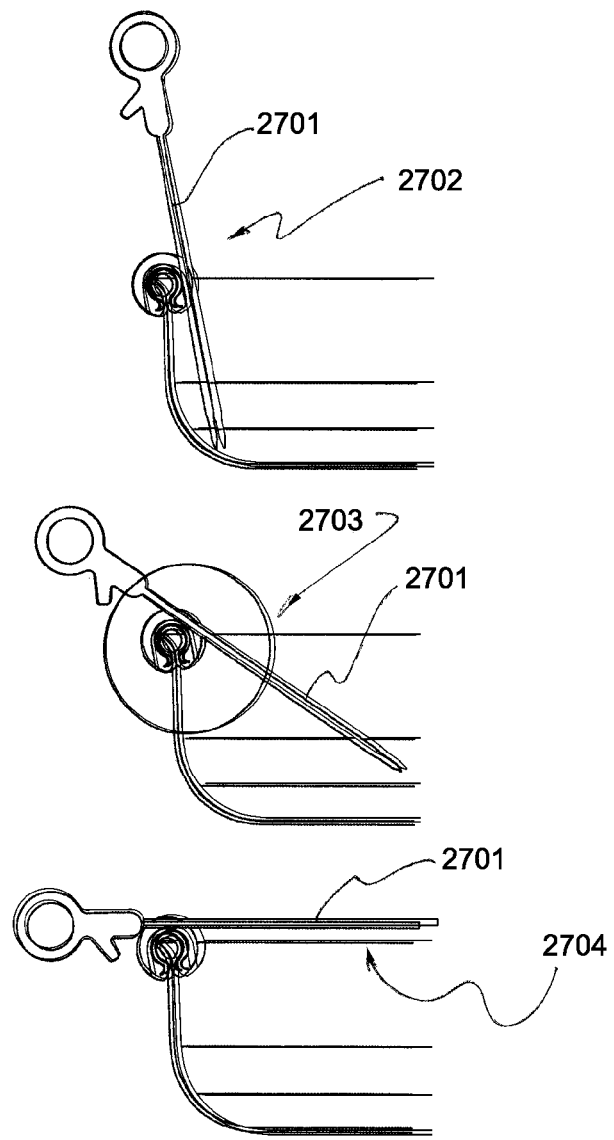
FIG. 27 is a schematic diagram illustrating uses of a temperature probe holder.

As shown in FIG. 25, the depth of the circumferential groove 2403 is preferably deeper than the thickness of the probe stem 2203. The holder may have embedded within it a resilient clip 2501 that maintains the shape of the holder and allows it to return to its rest position when withdrawn from a pot. The clip also improves the resiliency and clamping force of the holder when it is installed on a pot or vessel. In this example, the central opening 2404 is approximately one third of the overall diameter of the holder. The adjacent clamping edges of the clip 2502, 2503 may be rounded so as to accommodate a wide variety of pot shapes and thicknesses. As shown in FIG. 26, the groove 2403 is preferably located on the centre line between the opposite edges 2601, 2602 of the holder. As shown in FIG. 27, the stem 2701 may be releasably clamped within the holder's groove in a variety of orientations. Illustrated are examples of an upright orientation 2702, and inclined orientation 2703 and a generally horizontal orientation 2704. The holder retains the stem by interference or friction, the width of the groove being narrower than the diameter of stem 2701. This stem can be inserted, repositioned and removed easily.

Figure 28:
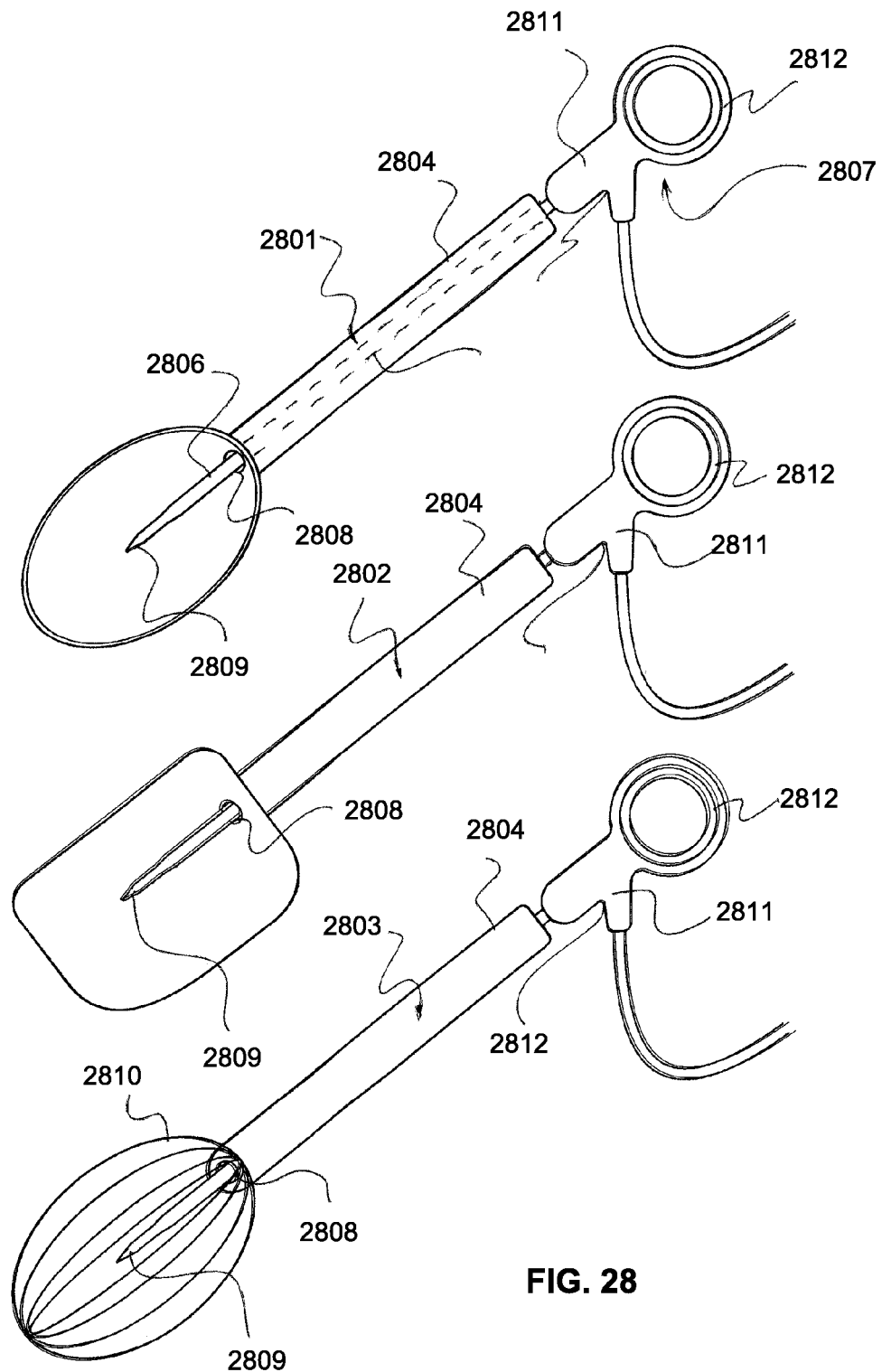
FIG. 28 are perspective views of appliances incorporating a temperature probe.

As shown in FIG. 28 a variety of cooking tools may either incorporate or be adapted to incorporate a temperature probe of the type suggested by FIG. 22. For example, a cooking spoon 2801, a spatula 2302 or a whisk 2803 may have a handle 2804 in which is formed a longitudinal through bore 2805. The bore 2805 is adapted to receive the stem 2806 of a temperature probe 2807, either permanently or removably. In these examples, the working part of the spoon, spatula or whisk is provided with an exit opening 2808 that allows the end of the stem and particularly the tip 2809 to protrude into a location adjacent to the respective working part of the spoon, spatula or whisk. In the example of the whisk 2803, the probe tip 2809 terminates within the cage or array of wire 2810 forming the working part of the whisk. In these examples, the probe's handle 2811 comes to rest, when installed, adjacent to a terminal end of the handle 2804. The handle's ring 2812 allows for the easy installation of the stem through the central bore 2805. The handle's saddle 2812 remains functional for the purpose of supporting the cooking tool and its temperature probe on the rim of a cooking vessel, when in use.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

What is claimed is:

1. An induction cooker device comprising:
   a body above which is mounted a heat stable cooking surface, the cooking surface having a central through opening, and including a chamfer formed around and adjacent to the central through opening of the cooking surface;

a temperature sensor supported by a temperature sensor assembly and positioned within the central through opening;

a clamping assembly disposed adjacent the central through opening, the clamping assembly comprising a clamping ring having an outwardly extending chamfered flange sized to overlie and engage the chamfer formed around the central through opening;

the clamping assembly further supporting the temperature sensor assembly and arranged to upwardly bias the temperature sensor and to permit reciprocal motion of the temperature sensor between a first position protruding above the cooking surface and a second position flush with the cooking surface;

the clamping assembly further including a lower sensor bracket disposed about the central through opening and operatively coupled to an underside of the cooking surface, the clamping ring having threads engaging cooperating threads on the lower sensor bracket;

wherein rotation of the clamping ring relative to the cooktop and the lower sensor bracket draws the clamping ring into a clamping engagement with the cooking surface with the chamfered flange bearing against the chamfer formed around the central through opening and with the chamfered flange disposed below the cooking surface.

2. The device of claim 1, wherein:
the lower sensor bracket supports a compression spring and a sensor holder;
the sensor holder further comprises a chamfered surround that forms a circumferential ramp, a lower edge of the chamfered surround, when fully extended, being below an upper surface of the cooking surface.

3. The device of claim 2, wherein:
a sensor cap is retained by the sensor holder with a clevis clip.

4. The device in claim 1, wherein:
the clamping ring has an opening in an upper rim arranged to receive a tool used to torque the clamping ring.

5. The device of claim 1, wherein:
the clamping ring terminates above an upper surface of the cooking surface.

6. The device of claim 1, wherein:
the cooking surface is adhesively mounted to a mounting frame.

7. The device of claim 1, wherein:
an insulation layer is located below the cooking surface.

8. The device of claim 1, wherein:
the device is carried by a body that supports the cooking surface, the body having an internal chassis component that defines an air flow path.

9. The device of claim 1, including an upper sensor bracket operatively coupled to an underside of the cooking surface, and wherein the lower sensor bracket is coupled to the upper sensor bracket.

10. The device of claim 9, wherein:
the upper sensor bracket has teeth that engage cooperating teeth on the lower sensor bracket.

11. An induction cooker device comprising:
a body above which is mounted a heat stable cooking surface, the cooking surface having a central through opening, and including a chamfer formed around and adjacent to the central through opening of the cooking surface;

a temperature sensor supported by a temperature sensor assembly and positioned within the central through opening;

a clamping assembly disposed adjacent the central through opening, the clamping assembly comprising a clamping ring having an outwardly extending chamfered flange sized to overlie and engage the chamfer formed around the central through opening;

the clamping assembly further supporting the temperature sensor assembly and arranged to upwardly bias the temperature sensor and to permit reciprocal motion of the temperature sensor between a first position protruding above the cooking surface and a second position flush with the cooking surface;

the clamping assembly further including a lower sensor bracket disposed about the central through opening and operatively coupled to an underside of the cooking surface, the clamping ring having threads engaging cooperating threads on the lower sensor bracket;

wherein rotation of the clamping ring relative to the cooktop and the lower sensor bracket draws the clamping ring into a clamping engagement with the cooking surface with the chamfered flange bearing against the chamfer formed around the central through opening and with the chamfered flange disposed below the cooking surface;

wherein the lower sensor bracket supports a compression spring and a sensor holder having an upper sensor holder and a lower sensor holder, and wherein the sensor holder further includes a chamfered surround that forms a circumferential ramp, and wherein a lower edge of the chamfered surround, when fully extended, is below an upper surface of the cooking surface; and wherein the lower sensor holder is restrained from rotating relative to the lower sensor bracket.

12. The device of claim 11, wherein:
the upper sensor holder and the lower sensor holder cooperate to receive a rim of a polymer diaphragm.

13. An induction cooker device comprising:
a body above which is mounted a heat stable cooking surface, the cooking surface having a central through opening, and including a chamfer formed around and adjacent to the central through opening of the cooking surface;

a temperature sensor supported by a temperature sensor assembly and positioned within the central through opening;

a clamping assembly disposed adjacent the central through opening, the clamping assembly comprising a clamping ring having an outwardly extending chamfered flange sized to overlie and engage the chamfer formed around the central through opening;

the clamping assembly further supporting the temperature sensor assembly and arranged to upwardly bias the temperature sensor and to permit reciprocal motion of the temperature sensor between a first position protruding above the cooking surface and a second position flush with the cooking surface;

the clamping assembly further including a lower sensor bracket disposed about the central through opening and operatively coupled to an underside of the cooking surface, the clamping ring having threads engaging cooperating threads on the lower sensor bracket;

wherein rotation of the clamping ring relative to the cooktop and the lower sensor bracket draws the clamping ring into a clamping engagement with the cooking surface with the chamfered flange bearing against the chamfer formed around the central through opening and with the chamfered flange disposed below the cooking surface;

wherein the lower sensor bracket supports a compression spring and a sensor holder having an upper sensor holder and a lower sensor holder;

wherein the sensor holder further comprises a chamfered surround that forms a circumferential ramp, a lower edge of the chamfered surround, when fully extended, being below an upper surface of the cooking surface; and wherein the sensor mount assembly defines a liquid flow path, the flow path passing through a gap located between the lower sensor holder and the lower sensor bracket.

14. The device of claim 13, wherein:
the body has, at a terminus of the flow path, a perforated cover.

15. An induction cooker device comprising:
a body above which is mounted a heat stable cooking surface, the cooking surface having a central through opening, and including a chamfer formed around and adjacent to the central through opening of the cooking surface;
a temperature sensor supported by a temperature sensor assembly and positioned within the central through opening;
a clamping assembly disposed adjacent the central through opening, the clamping assembly comprising a clamping ring having an outwardly extending chamfered flange sized to overlie and engage the chamfer formed around the central through opening;
the clamping assembly further supporting the temperature sensor assembly and arranged to upwardly bias the temperature sensor and to permit reciprocal motion of the temperature sensor between a first position protruding above the cooking surface and a second position flush with the cooking surface;
the clamping assembly further including a lower sensor bracket disposed about the central through opening and operatively coupled to an underside of the cooking surface, the clamping ring having threads engaging cooperating threads on the lower sensor bracket;
wherein rotation of the clamping ring relative to the cooktop and the lower sensor bracket draws the clamping ring into a clamping engagement with the cooking surface with the chamfered flange bearing against the chamfer formed around the central through opening and with the chamfered flange disposed below the cooking surface; and
wherein the temperature sensor assembly includes an upper sensor holder and a lower sensor holder, and including a diaphragm surrounding the temperature sensor assembly, an inner portion of the diaphragm secured between the upper sensor holder and the lower sensor holder, and an outer portion of the diaphragm secured between the lower sensor bracket and the clamping ring.

16. The device of claim 15, wherein the device further includes a heating coil, and wherein the cooking surface overlies the heating coil.

17. The device of claim 15, wherein the heating coil comprises an induction heating coil.

* * * * *